(12) United States Patent
Lin

(10) Patent No.: US 8,700,378 B1
(45) Date of Patent: Apr. 15, 2014

(54) SYMBOLIC EXPRESSION PROPAGATION TO SUPPORT GENERATING RECONFIGURATION CODE

(75) Inventor: Xiaocang Lin, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 1635 days.

(21) Appl. No.: 12/000,436

(22) Filed: Dec. 12, 2007

(51) Int. Cl.
 *G06F 17/50* (2006.01)
 *G06G 7/62* (2006.01)
 *G06F 9/44* (2006.01)

(52) U.S. Cl.
 USPC ............... 703/14; 703/13; 717/131; 716/102; 706/52

(58) Field of Classification Search
 USPC .......... 703/14, 13; 717/131; 716/102; 706/52
 See application file for complete search history.

(56) References Cited

U.S. PATENT DOCUMENTS 7,275,026 B2 * 9/2007 Mani et al. ...................... 703/13
7,346,480 B1 * 3/2008 Pekarek et al. ................. 703/14
7,509,244 B1 * 3/2009 Shakeri et al. .................... 703/7
7,849,440 B1 * 12/2010 Englehart ..................... 717/106
2006/0064670 A1 * 3/2006 Linebarger et al. ........... 717/106

OTHER PUBLICATIONS

Simulink, Simulink, Simulation and model Based Design), Version 6, Sep. 2005.*
Kevin Warren Morency, "Automatic Generation of Real Time Simulation Code for Vehicle Dynamics using Linear Graph Theory and Symbolic Computing", May 2007.*
Lori A. Clarke, "A system to generate test data and symbolically execute programs", Sep. 1976.*

* cited by examiner

*Primary Examiner* — Omar Fernandez Rivas
*Assistant Examiner* — Angel Calle
(74) *Attorney, Agent, or Firm* — Venable LLP; Michael A. Sartori; Todd R. Farnsworth

(57) ABSTRACT

A graphical model is received and includes a plurality of entities and connectivity information between the entities. The entities include properties, behavioral descriptions, and optionally behavioral constraints. A symbolic expression is received. The symbolic expression represents a property of a first entity in the graphical model. A second entity is identified. The second entity includes the property represented by the symbolic expression. The second entity is identified based on at least one of the connectivity information, a behavioral description, or a behavioral constraint. The symbolic expression is propagated to the second entity. The second entity is expressed in terms of the propagated symbolic expression. An updated graphical model is generated.

23 Claims, 18 Drawing Sheets model.h file:

define A (B+B)

...
```
34    typedef struct {
35        real_T In1[A];                /* '<Root>/In1' */
36        real_T In2[B];                /* '<Root>/In2' */
37        real_T In3[B];                /* '<Root>/In3' */
38    } ExternalInputs_model;
39
40    /* External outputs (root outports fed by signals with auto storage) */
41    typedef struct {
42        real_T Out1[A];               /* '<Root>/Out1' */
43    } ExternalOutputs_model;
```
...

model.c file:

...
```
38        for (i = 0; i < B; i++) {
39            model_Y.Out1[i] = model_U.In1[i] + model_U.In2[i];
40        }
41
42        for (i = 0; i < B; i++) {
43            model_Y.Out1[i + B] = model_U.In1[i + B] +
model_U.In3[i];
44        }
```
...

FIG. 8

```
1    ...
2    static void rate_monotonic_scheduler(void)
3    {
4      ttt_M->Timing.RateInteraction.TID0_1 = (ttt_M-
5    >Timing.TaskCounters.TID[1] == 0);
6      if (++ttt_M->Timing.TaskCounters.TID[1] == N) {
7        ttt_M->Timing.TaskCounters.TID[1] = 0;
8      }
9    }
10
11   void ttt_step0(void)
12   {
13     {
14       rate_monotonic_scheduler();
15     }
16
17     {
18       real_T HoldSine;
19       if (ttt_DWork.systemEnable == 1) {
20         ttt_DWork.lastSin = sin((ttt_M->Timing.clockTick0) * T );
21         ttt_DWork.lastCos = cos((ttt_M->Timing.clockTick0) * T );
22         ttt_DWork.systemEnable = 0;
23       }
24
25       ttt_B.SineWave = (ttt_DWork.lastSin * cos(T) +
26                         ttt_DWork.lastCos * -sin(T)) *
27         cost(T) + (ttt_DWork.lastCos * cos(T) -
28         ttt_DWork.lastSin * -sit(T)) * sin(T);
29       if (ttt_M->Timing.RateInteraction.TID0_1) {
30         ttt_B.ZeroOrderHold = ttt_B.SineWave;
31       }
32
33       HoldSine = ttt_DWork.lastSin;
34       ttt_DWork.lastSin = ttt_DWork.lastSin * cos(T) +
35         ttt_DWork.lastCos * sin(T);
36       ttt_DWork.lastCos = ttt_DWork.lastCos * cos(T) - HoldSine *
37         sin(T);
38     }
39
40     ttt_M->Timing.clockTick0++;
41   }
42   ...
43
44
45                              FIG. 9C
```

```
1   ...
2   static void rate_monotonic_scheduler(void)
3   {
4     ttt_M->Timing.RateInteraction.TID0_1 = (ttt_M-
5   >Timing.TaskCounters.TID[1] == 0);
6     if (++ttt_M->Timing.TaskCounters.TID[1] == 2) {
7       ttt_M->Timing.TaskCounters.TID[1] = 0;
8     }
9   }
10
11  void ttt_step0(void)
12  {
13    {
14      rate_monotonic_scheduler();
15    }
16
17    {
18      real_T HoldSine;
19      if (ttt_DWork.systemEnable == 1) {
20        ttt_DWork.lastSin = sin((ttt_M->Timing.clockTick0) * 0.3 );
21        ttt_DWork.lastCos = cos((ttt_M->Timing.clockTick0) * 0.3 );
22        ttt_DWork.systemEnable = 0;
23      }
24
25      ttt_B.SineWave = (ttt_DWork.lastSin * 9.5533648912560598E-001 +
26                       ttt_DWork.lastCos * -2.9552020666133955E-001) *
27       9.5533648912560598E-001 + (ttt_DWork.lastCos *
28  9.5533648912560598E-001 -
29        ttt_DWork.lastSin * -2.9552020666133955E-001) *
30  2.9552020666133955E-001;
31      if (ttt_M->Timing.RateInteraction.TID0_1) {
32        ttt_B.ZeroOrderHold = ttt_B.SineWave;
33      }
34
35      HoldSine = ttt_DWork.lastSin;
36      ttt_DWork.lastSin = ttt_DWork.lastSin * 9.5533648912560598E-001 +
37        ttt_DWork.lastCos * 2.9552020666133955E-001;
38      ttt_DWork.lastCos = ttt_DWork.lastCos * 9.5533648912560598E-001 -
39  HoldSine *
40        2.9552020666133955E-001;
41    }
42
43    ttt_M->Timing.clockTick0++;
44  }
45  ...
46
47                              FIG. 9D
```

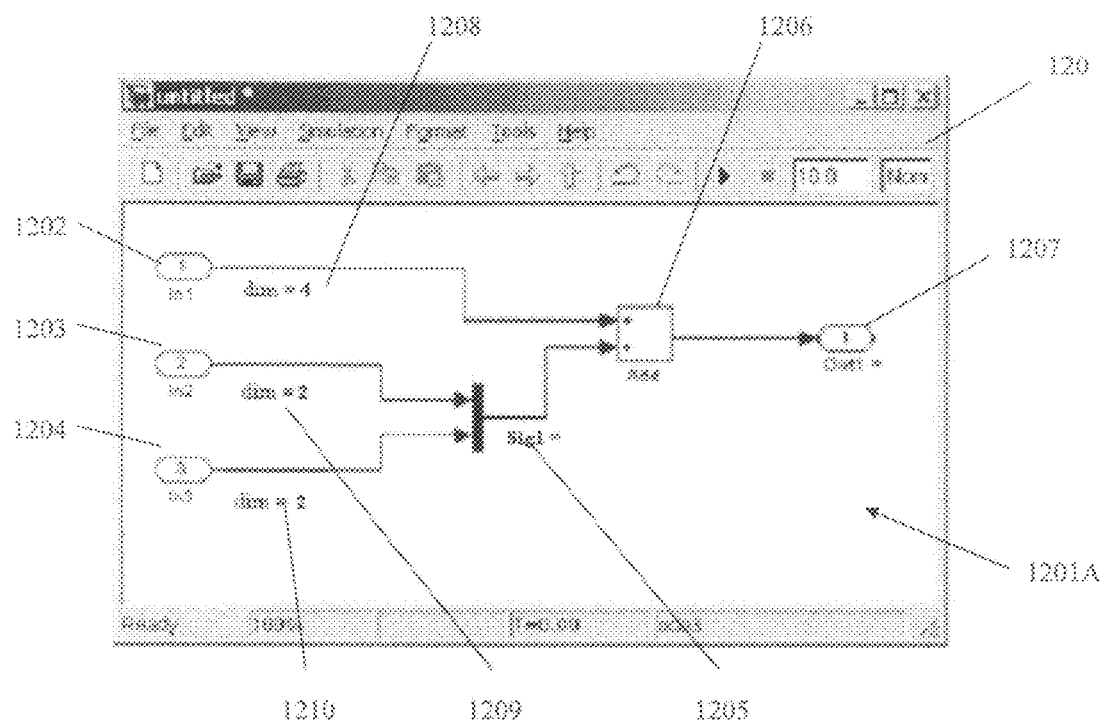
FIG. 12A - PRIOR ART
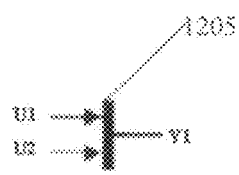
FIG. 12B - PRIOR ART
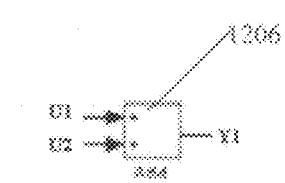
FIG. 12C - PRIOR ART

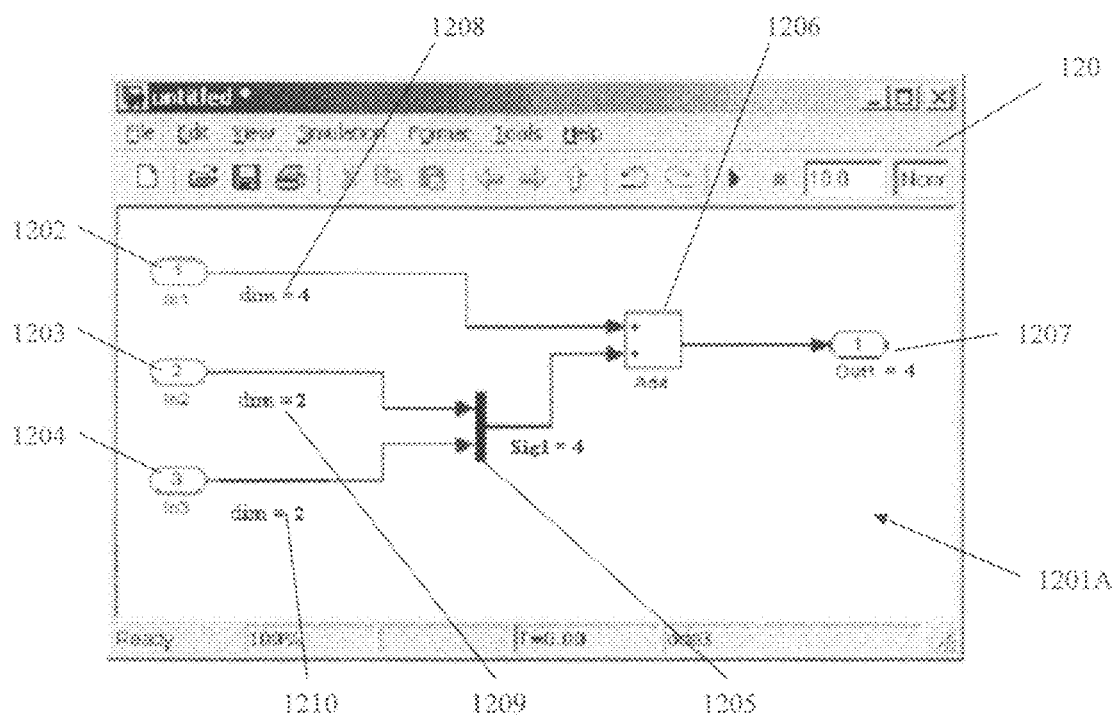
FIG. 12D – PRIOR ART

```
model.h file:
...
    34  typedef struct {
    35      real_T In1[4];                          /* '<Root>/In1' */
    36      real_T In2[2];                          /* '<Root>/In2' */
    37      real_T In3[2];                          /* '<Root>/In3' */
    38  } ExternalInputs_model;
    39
    40  /* External outputs (root outports fed by signals with auto
storage) */
    41  typedef struct {
    42      real_T Out1[4];                         /* '<Root>/Out1' */
    43  } ExternalOutputs_model;
...
model.c file:
...
    35      model_Y.Out1[0] = model_U.In1[0] + model_U.In2[0];
    36      model_Y.Out1[1] = model_U.In1[1] + model_U.In2[1];
    37      model_Y.Out1[2] = model_U.In1[2] + model_U.In3[0];
    38      model_Y.Out1[3] = model_U.In1[3] + model_U.In3[1];
...
```

FIG. 13A – PRIOR ART

```
model.h file:
...
    34  typedef struct {
    35      real_T In1[4];                          /* '<Root>/In1' */
    36      real_T In2[2];                          /* '<Root>/In2' */
    37      real_T In3[2];                          /* '<Root>/In3' */
    38  } ExternalInputs_model;
    39
    40  /* External outputs (root outports fed by signals with auto
storage) */
    41  typedef struct {
    42      real_T Out1[4];                         /* '<Root>/Out1' */
    43  } ExternalOutputs_model;
...
model.c file:
...
    38      for (i = 0; i < 2; i++) {
    39          model_Y.Out1[i] = model_U.In1[i] + model_U.In2[i];
    40      }
    41
    42      for (i = 0; i < 2; i++) {
    43          model_Y.Out1[i + 2] = model_U.In1[i + 2] +
model_U.In3[i];
    44      }
...
```

FIG. 13B – PRIOR ART

SYMBOLIC EXPRESSION PROPAGATION TO SUPPORT GENERATING RECONFIGURATION CODE

BACKGROUND

Modeling and simulation tools may allow a developer to design, simulate, implement, and/or test control, signal processing, communications, and other time-varying systems. These modeling tools may represent a system with a graphical model having at least one entity. Values being input to the system may then be propagated through the graphical model during simulation of the graphical model. Input value(s) may be propagated through entities within the graphical model by having each entity receive an input value(s), manipulate the input value(s) in accordance with the defined behavior of the entity, and produce a finalized result in the form of an output value(s). This finalized result may then be propagated as input value(s) to any connected next entity(ies) in the graphical model. Once propagation is complete, code may be generated. However, if an input value(s) to the system is changed after the propagation is complete, the simulation must be re-started so that the changed input value(s) may be propagated through the graphical model.

FIGS. 12A-12D depict an exemplary propagation operation according to the prior art. In FIG. 12A, the depicted graphical model 1201A may include an input block 1202, an input block 1203, an input block 1204, a multiplexer (Mux block) 1205, a sum block 1206, and an output block 1207. Dimensional values of '4', '2', and '2' may be received by input blocks 1202, 1203, and 1204, respectively. FIG. 12B depicts the Mux block 1205. Dimensional values may be propagated through Mux block 1205, for example, according to the rule: dim(Y1)=dim(U1)+dim(U2) (hereinafter rule 1). FIG. 12C depicts the sum block 1206. Dimensional values may be propagated through sum block 1206, for example, according to the rule: dim(Y1)=dim(U1) and dim(Y1)=dim(U2) (hereinafter rule 2).

In FIG. 12D, the depicted graphical model may be simulated. During propagation, the input numerical values '4', '2', and '2' may be provided to the system and propagated through Mux block 1205 and sum block 1206 in accordance with rules 1 and 2. Specifically, dim(In)1=4, dim(In2)=2, and dim(In3)=2. With respect to the Mux Block 1205, according to rule 1, dim(Sig1)=dim(In2)+dim(In3)=2+2=4. With respect to the sum block 1206, according to rule 2, dim(Out1)=dim(Sig1)=4 and dim(Out1)=dim(In1)=4. Because rule 2 is not violated, i.e. dim(Sig1)=4 and dim(Out1)=dim(In1)=4, there is no conflict. Notably, only numeric values, not representations thereof, can be provided and propagated through the system.

FIGS. 13A and 13B depict two exemplary realizations of code based on the model in FIG. 12D. Both FIGS. 13A and 13B may be comprised of two files, the model.h file and the model.c file. The model.h file for both FIGS. 13A and 13B begin by defining the dimensional properties of signals 'In1,' 'In2,' and 'In3' as '4,' '2,' and '2,' respectively, which are then used in lines 40-43 to define the output value. The model.c files of FIGS. 13A and 13B contain two potential descriptions of the operation of the Mux block 705 and the sum block 706. Notably, the propagated attributes in FIGS. 13A and 13B have been finalized. Thus, in order to re-target the model to a different set of attributes, attribute propagation and code generation must be re-started.

Conventional modeling and simulation tools may provide the ability to represent a specific property in a model with a symbolic expression. The symbolic expression may be specified by a default setting and/or by a user. However, the symbolic expression is generally limited to a single entity in the model, e.g. a block, and must be substituted with an actual value prior to the simulation of the model. Thus, the symbolic expression cannot be propagated through the graphical model. The conventional modeling and simulation tools may also require significant support in the form of memory or execution overhead and the code may need to be regenerated when used for different applications.

SUMMARY

In one exemplary embodiment a computer-readable medium stores computer-executable instructions. The medium holds one or more instructions for receiving a graphical model. The graphical model comprises a plurality of entities and connectivity information between the entities. The entities comprise properties, behavioral descriptions, and optionally behavioral constraints. The medium also holds one or more instructions for receiving a symbolic expression for the graphical model. The symbolic expression represents a property of a first entity in the graphical model. The medium also holds one or more instructions for identifying a second entity comprising the property represented by the symbolic expression. The second entity is identified based on at least one of the connectivity information, a behavioral description, or a behavioral constraint. The medium also holds one or more instructions for propagating the symbolic expression to the second entity. The medium also holds one or more instructions for expressing the second entity in terms of the propagated symbolic expression. The medium also holds one or more instructions for generating an updated graphical model based on the expressing.

Another exemplary embodiment a computer-implemented method for propagates symbolic expressions. A graphical model is identified. The graphical model comprises a first entity coupled to a second entity and connectivity information. The first entity comprises a first property, a first behavioral constraint, and optionally a first behavioral description. The second entity comprises the first property, a second behavioral constraint, and optionally a second behavioral description. The first behavioral constraint and the second behavioral constraint are identical or different. The first behavioral description and the second behavioral description are identical or different. A first symbolic expression is received to represent the first property of the first entity in the graphical model. The first property is identified in the first entity and the first property in the second entity based on at least one of the connectivity information, a behavioral constraint of the first entity or the second entity, or a behavioral description of the first entity or the second entity. The first symbolic expression is propagated to the second entity to represent the first property of the second entity with the first symbolic expression. The first and the second entities are propagated in terms of the first symbolic expression to obtain an updated graphical model. The updated graphical model is displayed.

Another exemplary embodiment a system propagates symbolic expressions. A graphical model is identified. The graphical model comprises a first entity coupled to a second entity and connectivity information. The first entity comprises a first property, a first behavioral constraint, and optionally a first behavioral description. The second entity comprises the first property, a second behavioral constraint, and optionally a second behavioral description. The first behavioral constraint and the second behavioral constraint are identical or different. The first behavioral description and the second behavioral description are identical or different. A first symbolic expression is received to represent the first property of the first entity in the graphical model. The first property is identified in the first entity and the first property in the second entity based on at least one of the connectivity information, a behavioral constraint of the first entity or the second entity, or a behavioral description of the first entity or the second entity. The first symbolic expression is propagated to the second entity to represent the first property of the second entity with the first symbolic expression. The first and the second entities are propagated in terms of the first symbolic expression to obtain an updated graphical model. The updated graphical model is displayed.

In one exemplary embodiment a computer performs operations for initiating a computing environment. The computing environment includes a symbol propagation engine. The symbol propagation engine receives a symbolic expression for a graphical model. The graphical model is comprised of a plurality of entities and each entity comprises at least one property and at least one behavioral description related to the entity. The symbolic expression represents at least one property of at least one entity. The symbolic propagation engine identifies, based on behavioral constraints and connectivity of the entities, properties shared by the entities. The symbolic propagation engine propagates the symbolic expressions to the entities sharing each property of the symbolic expressions such that the relationship between the symbolic expressions is preserved. Each entity receiving the propagated symbolic expression is then expressed in terms of the propagated symbolic expression to obtain an updated graphical model.

In another exemplary embodiment, a method propagates symbols. A symbolic expression for a graphical model is received. The graphical model comprises a plurality of entities. Each entity comprises at least one property and at least one behavioral description related to the entity. The symbolic expression represents at least one property of at least one entity. The symbolic expression is propagated to the entities sharing each property of the symbolic expression. Each entity receiving the propagated symbolic expression is expressed in terms of the propagated symbolic expression to obtain an updated graphical model.

In another exemplary embodiment, a system propagates symbolic expressions. A symbolic expression for a graphical model is received. The graphical model comprises a plurality of entities. Each entity comprises at least one property and at least one behavioral description related to the entity. The symbolic expression represents at least one property of at least one entity. The symbolic expression is propagated to the entities sharing each property of the symbolic expression. Each entity receiving the propagated symbolic expression is expressed in terms of the propagated symbolic expression to obtain an updated graphical model.

In another embodiment a computer performs operations for propagating symbolic expressions. A graphical model is identified. The graphical model includes a first entity coupled to a second entity. The first entity and the second entity each include a first property. A first symbolic expression is received to represent the first property of the first entity in the graphical model. The first property in the first entity and the second entity is identified, based on behavioral constraints and connectivity information of the first entity and the second entity. The first symbolic expression is propagated to the second entity to represent the first property of the second entity with the first symbolic expression. The first and the second entities are expressed in terms of the first symbolic expression to obtain a updated graphical model.

In another embodiment, a method propagates symbolic expressions. A graphical model is identified. The graphical model includes a first entity coupled to a second entity. The first entity and the second entity each include a first property. A first symbolic expression is received to represent the first property of the first entity in the graphical model. The first symbolic expression is propagated to the second entity to represent the first property of the second entity with the first symbolic expression. The first and the second entities are expressed in terms of the first symbolic expression to obtain a updated graphical model.

In another embodiment, a system propagates the symbolic expression. A graphical model is identified. The graphical model includes a first entity coupled to a second entity. The first entity and the second entity each include a first property. A first symbolic expression is received to represent the first property of the first entity in the graphical model. The first symbolic expression is propagated to the second entity to represent the first property of the second entity with the first symbolic expression.

BRIEF DESCRIPTION OF THE DRAWINGS

The foregoing and other features of exemplary embodiments described herein will be apparent from the following description as illustrated in the accompanying drawings wherein like reference numbers generally indicate identical, functionally similar, and/or structurally similar elements. The left most digits in the corresponding reference number indicate the drawing in which an element first appears.

FIG. 8 depicts an exemplary generated code according to an embodiment.

FIGS. 9A-9D depict an exemplary embodiment used to propagate a sample rate and exemplary generated code according to an embodiment of the invention.

FIGS. 12A-12D depict an exemplary propagation operation according to the prior art.

FIGS. 13A and 13B depict two exemplary realizations of code according to the prior art.

DEFINITIONS

Figure 1:
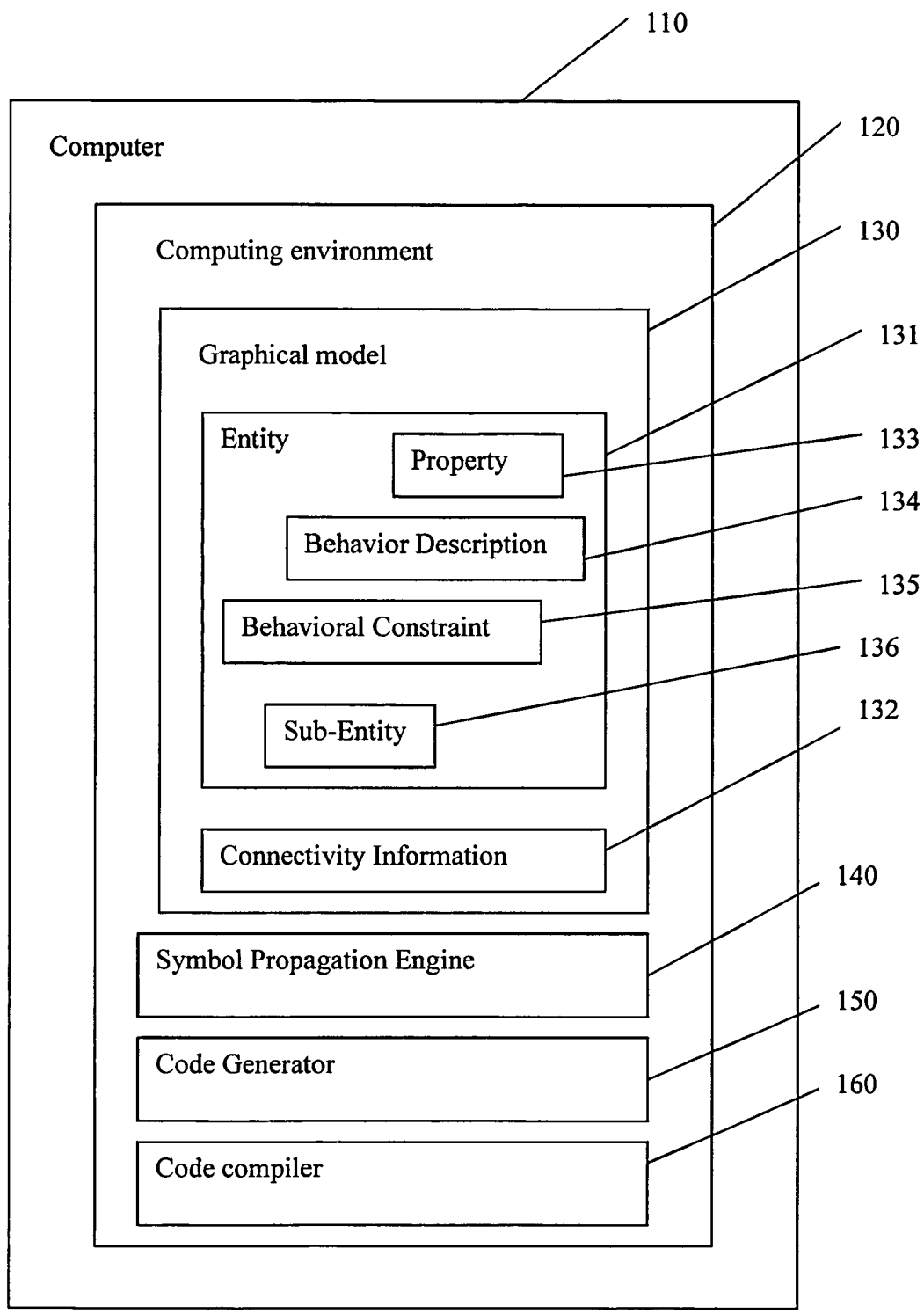
FIG. 1 depicts an exemplary embodiment of a computer for use with exemplary embodiments.

In describing exemplary embodiments, the following definitions are applicable throughout (including above).

A "computer" may refer to one or more apparatus and/or one or more systems that are capable of accepting a structured input, processing the structured input according to prescribed rules, and producing results of the processing as output.

Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); an optical computer; and an apparatus that may accept data, may process data in accordance with one or more stored software programs, may generate results, and typically may include input, output, storage, arithmetic, logic, and control units.

"Software" may refer to prescribed rules to operate a computer or a portion of a computer. Examples of software may include: code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an interne, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the illustrated embodiments are not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

In one embodiment, a symbol propagation engine may propagate symbolic expressions which describe a property common to multiple entities in a graphical model. In order to accomplish this, one or more symbolic expressions may be received by a computing environment. These symbolic expressions may represent a property of an entity within the graphical model. Once a symbolic expression is received, a symbol propagation engine may identify additional entities, which share the property represented by the symbolic expression, within the graphical model. After identifying these additional entities, the symbol propagation engine may express the property of each additional entity in terms of the symbolic expression. A code generator may then use these symbolic expressions when generating code. Upon receiving values for the symbolic expressions, which may be user or automatically specified, a code compiler may compile the generated code into executable code. The executable code may then be stored in a computer-readable medium.

Figure 2A:
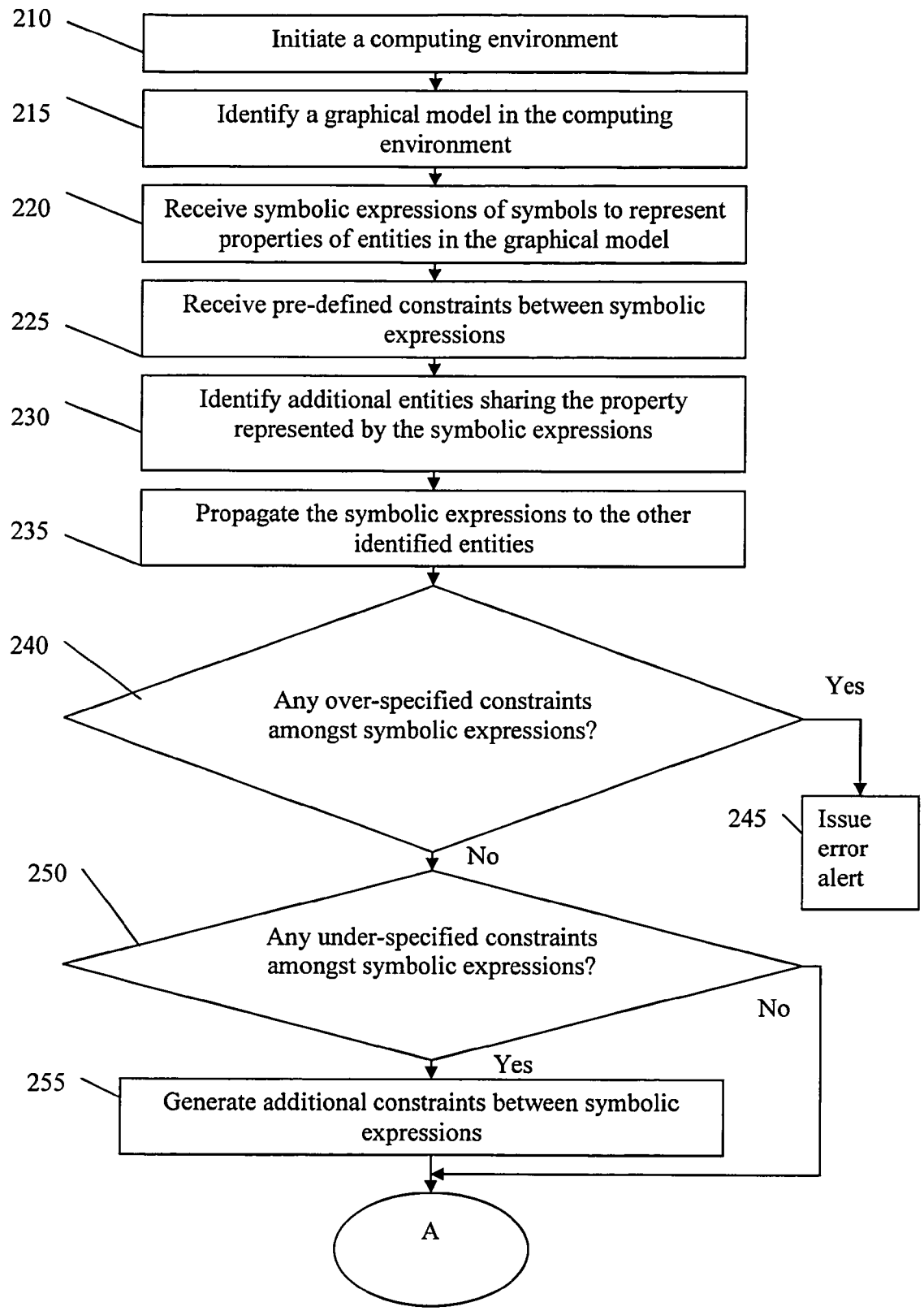
FIGS. 2A and 2B depict a flowchart of an exemplary technique of symbol propagation according an exemplary embodiment.
Figure 2B:
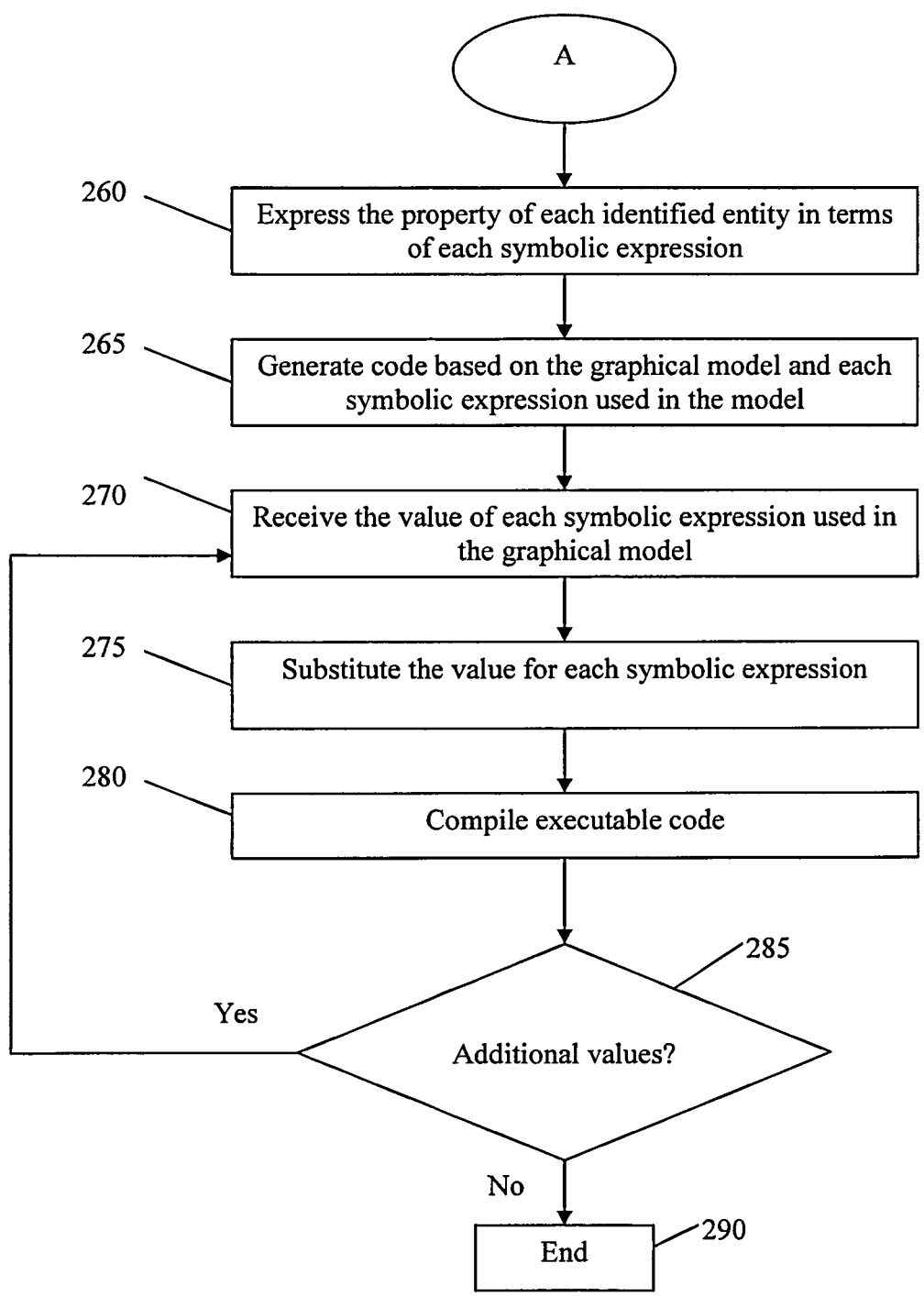

FIGS. 1 and 2 will now be explained using FIG. 3 as an example. In FIG. 1, a computer 110 is depicted for use with exemplary embodiments. In FIGS. 2A and 2B, a flowchart is depicted for an exemplary technique of symbolic expression propagation that utilizes the exemplary computer 110 of FIG. 1. In FIGS. 3A and 3B, an exemplary graphical user interface illustrating an exemplary symbolic expression propagation is depicted.

Referring to FIG. 1, the computer 110 may include a computing environment 120. The computing environment 120 may contain a graphical model 130, a symbol propagation engine 140, a code generator 150, and a code compiler 160. The graphical model 130 may contain at least one entity 131 and connectivity information 132. The entity 131 may contain at least one property 133 related to at least one behavioral description 134 and/or at least one behavioral constraint 135.

Referring to FIG. 2A, in block 210, an exemplary embodiment may be implemented within the computing environment 120 running on the computer 110, a computer system, or the like. As an example, the computing environment 120 may employ a matrix-based programming language. The matrix-based language may include commands which may operate on matrix data types. Vector data types may be considered to be a subset of matrix data types, as a vector may be considered to be a one-dimensional matrix. Examples of the matrix-based mathematical programming language may include the language of MATLAB® computing environment by The MathWorks, Inc. of Natick, Mass. or any other language that includes at least some commands that are executable in the MATLAB® computing environment. Alternative embodiments may employ other programming languages, whether industry standard or custom-designed. The techniques described herein may be embodied in functional components, such as, for example, in a function, a model, a class, or other program element. As another example, the computing environment 120 may employ the ability to generate a graphical model that may be simulated. Such a computing environment 120 may be based on, for example, Simulink® by The MathWorks, Inc. Stateflow® by The MathWorks, Inc., Simbiology™ by The MathWorks, Inc., LabView® by National Instruments, Inc., VisSim by Visual Solutions, Inc., or aspects of a Unified Modeling Language (UML). The techniques described herein may be embodied in functional components of such a computing environment 120, such as, for example, in a simulation block, or a simulation toolset. The techniques described herein may also generally be embodied in any textual and/or graphical programming environment. Additionally, the techniques described herein may be embedded within another computing environment such as, for example, a MATLAB® computing environment embedded within a Simulink® computing environment. In FIGS. 3A and 3B, an exemplary graphical user interface 300 is depicted for an exemplary computing environment, which may be an exemplary embodiment of the computing environment 120 in FIG. 1, and which may be based on Simulink® by The MathWorks, Inc.

In block 215, the graphical model 130 may be identified within the technical computer environment 120. The graphical model 130 may be identified by, for example, being created in or loaded into the computing environment 120. The graphical model 130 may contain at least one entity 131 and connectivity information 132. An entity 131 may refer to any object within the graphical model 130. An entity may include at least one property 133, at least one behavioral description 134 related to at least one property 133, at least one behavioral constraint 135 related to at least one property 133 and/or at least one sub-entities 136. Examples of an entity 131 may include a block, a combination of blocks, or a subsystem of blocks. Examples of a block may include an input block, a gain block, a sum block, an output block, a Mux block, a tool block, or any other type of block.

A property 133 associated with an entity 131 may refer to an attribute or characteristic of the entity 131. Examples of a property 133 may include data type information, execution timing, storage size, the numerical value of a signal, parameter, or internal data associated with the entity, or the number of dimensions a data type possesses (e.g. 1, 2, 3, or more dimensions).

A behavioral description 134 associated with an entity 131 may refer to a specified action or dedicated task of the entity 131. Examples of a behavioral description 134 may include one or more of a mathematical function, a graphical function, or a data analysis function. Examples of a mathematical function may include a differential equation, a difference equation, or equations involving, for example, addition, subtraction, multiplication, division, and determining a mean value. Examples of a graphical function may be illustrating a function over time or frequency. Examples of a data analysis function may be selecting specific data, discarding specific data, and curve fitting.

The behavioral constraint 135 of an entity 131 may refer to a constraint between two or more properties 133 of an entity that is deduced from a behavioral description 134 of the entity. Examples of behavioral constraints 135 may include setting the sample rate for the output signal of a first entity equal to the product of a property of the first entity and the sample rate of an input signal from a second entity, and setting the size of an entity's output signal equal to the sum of the sizes of all its input signals.

A sub-entity 136 of an entity 131 is related to and/or performs an entity's 131 property 133, behavioral description 134, and/or behavioral constraint 135. A sub-entity may include at least one property, at least one behavioral description 134, at least one behavioral constraint 135, and/or at least one sub-entity 136. For example, a sub-entity 136 may be related to an input signal or an output signal of the entity 131.

The connectivity information 132 of the graphical model 130 may refer to the connections between entities present in the graphical model 130. For example, the connectivity information 132 may refer to input/output connections to/from entities 131 within the graphical model 130. Behavioral descriptions 134, behavioral constraints 135 and, in turn, properties 133 may be implied from these connections. For example, a data connection between a sender entity and a receiver entity may dictate which of the properties of the output data signal of the sender block are shared by the input data signal of the receiver block.

Figure 3A:
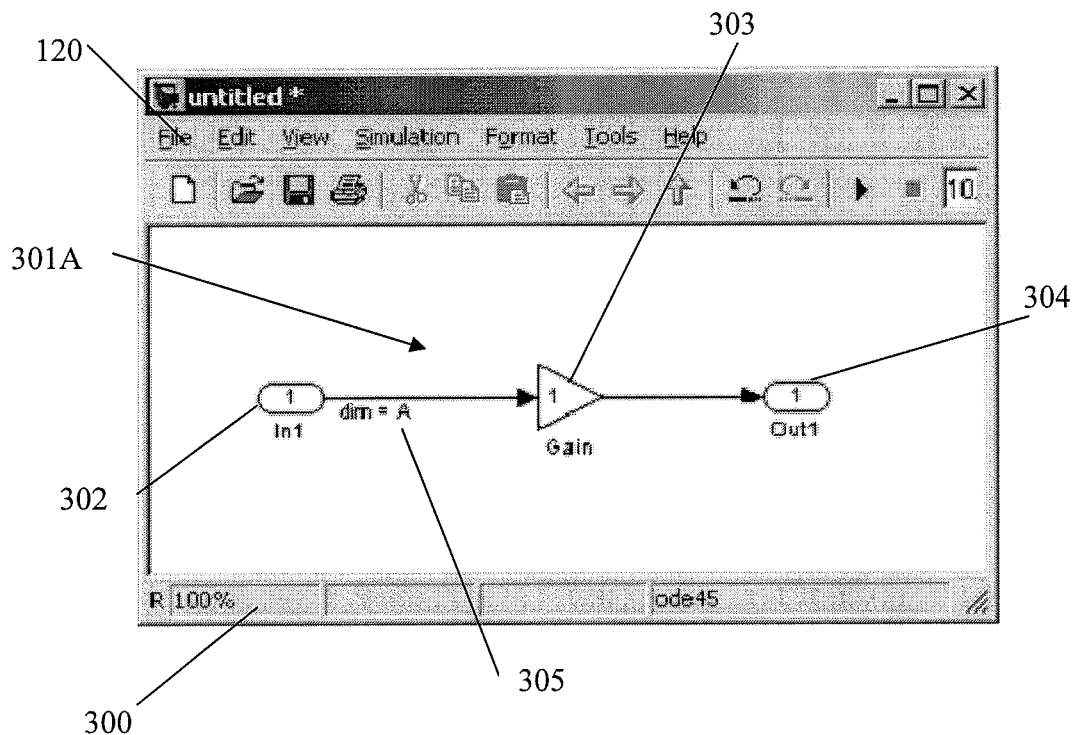
FIGS. 3A and 3B depict an exemplary graphical user interface illustrating exemplary symbol propagation.
Figure 3B:
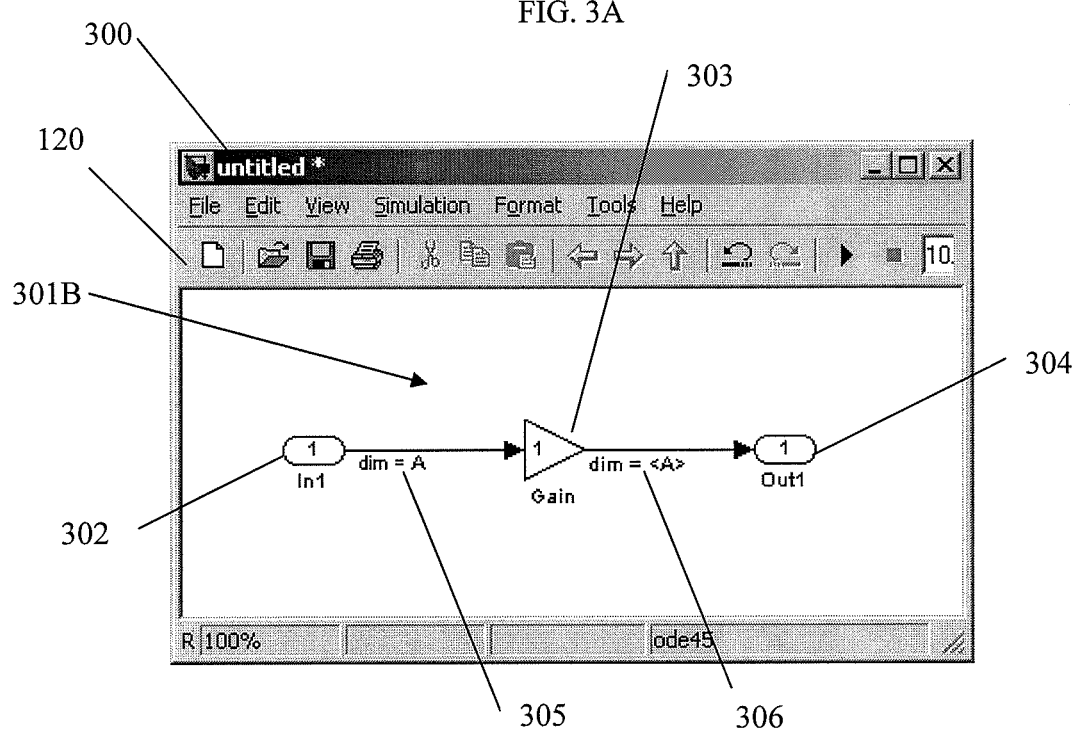

Referring now to figure FIG. 3A, the depicted graphical model 301A may be identified within the exemplary graphical user interface 300 of the exemplary technical computer environment. The graphical model 301A contains three entities: an input block 302, a gain block 303, and an output block 304. Input block 302 has, at least, a dimension property, representing the size of the output signal, and, at least, a behavioral description of receiving data. Gain block 303 has, at least, a dimension property and, at least, a behavioral description of receiving data, multiplying the received data by a value, and outputting the multiplied data. Output block 304 has, at least, a dimension property and, at least, a behavioral description of outputting data.

In block 220, one or more symbolic expressions may be received. A symbolic expression may represent one or more properties 133 of one or more entities 131 within the graphical model 130. For example, a symbolic expression may represent a number, such as, for example, a number of dimensions of a data set, a size of a dimension of a data set, a sampling rate of an entity, a data storage size of a signal, etc. A symbolic expression may include one or more symbols. A symbol may refer to one or more letters from the English, Latin, Greek, or any other language, numbers, mathematical expressions or pictorial representations. The symbolic expression(s) may be, for example, received from a user, and/or dynamically specified by the computing environment 120. A symbol may be received from a user, for example, via a window or command line accessed through a drop down menu or by double clicking or right clicking on an entity. The window may list the properties of one or more of the entities within the graphical model 130 and allow the user to assign symbolic expressions to one or more properties of the entities. Additional techniques for receiving symbolic expressions from a user may be apparent to one of ordinary skill in the art. A symbol may be dynamically specified where a symbol is necessary but where the user has not yet specified one. The symbol propagation engine 140 may then generate a symbol based on one or more pre-specified rules. One pre-specified rule may, for example, randomly generate a symbol not already present in the graphical model. The user may, for example, also customize the pre-specified rule to be in accordance with the user's preferences. In FIG. 3A, the symbolic expression 'A' may be received by the graphical user interface 300. The symbolic expression 'A' represents the dimension property of the input block 302. The graphical user interface 300 may depict the received symbolic expression 'A' along with the corresponding the dimension property at the output of block 302 as 'dim=A' 305.

In block 225, one or more constraints between symbolic expressions may be received. A constraint may represent a relationship among a number of symbolic expressions. For example, relationships among symbolic expressions may be numeric, algebraic, and/or logical. Each constraint may specify one or more relationships between symbolic expressions. The constraints may be received, for example, from a user, a default setting, and/or dynamically specified by the computing environment 120. Constraints are discussed further below with reference to FIGS. 6A, 6B, 7A, and 7B. In FIG. 3A, a constraint is not received, because there is only one symbolic expression, and the process continues to block 230.

In block 230, each entity sharing the property 133, represented by a symbolic expression from block 220, are identified by the symbol propagation engine 140. This identification may be based on at least one of the behavioral descriptions 134 and/or at least one of the behavioral constraints 135 of at least one entity within the graphical model 130 and/or any portion of the connectivity information 132 of the graphical model.

In FIG. 3A, the gain block 303 may be identified by the symbol propagation engine 140 as sharing that same dimension property as the input block 302. This identification may be based on the behavioral constraint of each entity within the depicted graphical model 301A. In this case, the input block 302 may be limited to receiving data, and the gain block 303 may be limited to multiplying received data by a value. The identification may also be based on the connectivity information present in the depicted graphical model 301A. In this case, the input block 302 may be connected to the gain block 303, which may be connected to the output block 304.

Figures 4A, 4B:
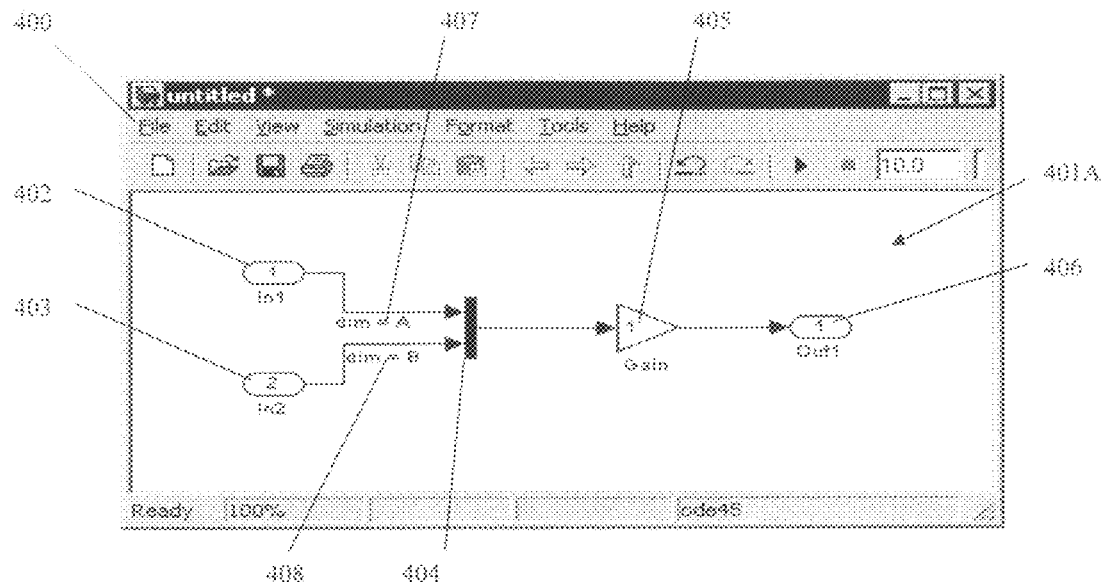
FIGS. 4A and 4B depict an exemplary propagation operation.

In block 235, the symbolic expression, received in block 220, may be propagated to the additional entities, identified in block 230, in the graphical model 130 by the symbol propagation engine 140. While individual symbolic expressions are being propagated, new symbolic expressions may be generated when, for example, entities within the graphical model 130 combine several individual symbolic expressions into a single, combined symbolic expression. These combined symbolic expressions may be different than the symbolic expressions received in block 220. The combined expressions may express the relationship between the individual symbolic expressions, for example, mathematically or graphically. The combined symbolic expressions may be propagated forward as well. During propagation, the relationship among the combined, individual symbolic expressions may be preserved in the combined symbolic expressions. The symbol propagation engine 140 may utilize any conventional forward propagation and/or backward propagation algorithms during propagation. FIGS. 4A and 4B, which are discussed further below, illustrate how two individual symbolic expressions may be combined into a new symbolic expression and propagated forward. In FIG. 3A, the dimension property of the input block 302, 'A', is propagated to the gain block 303.

Figure 5A:
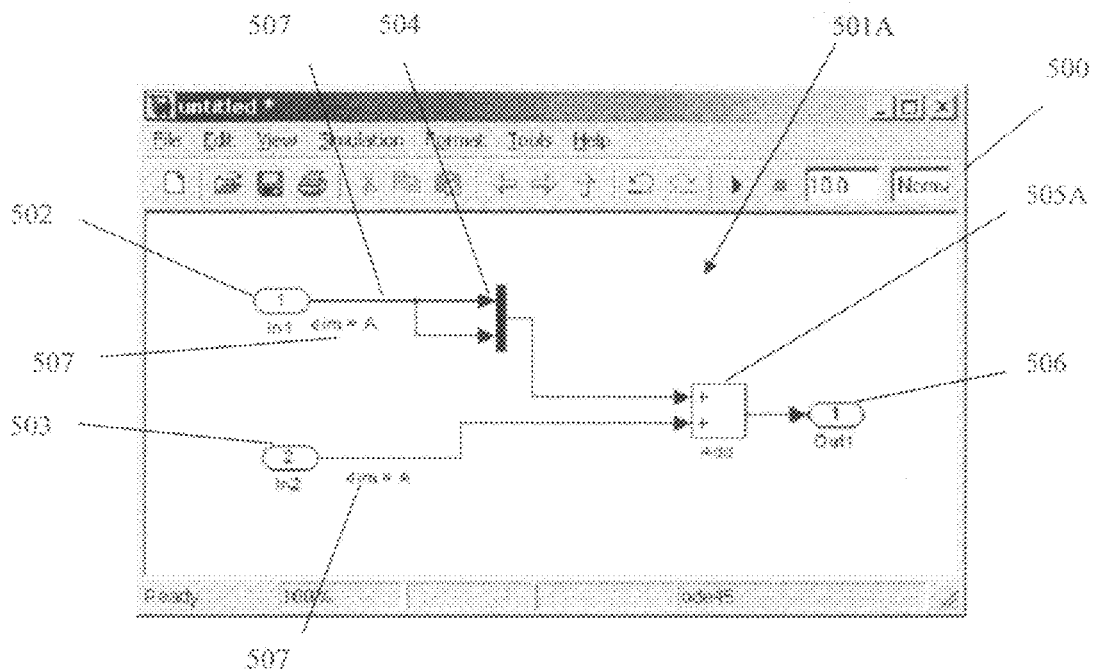
FIGS. 5A and 5B depict an exemplary error detection operation.
Figure 5B:
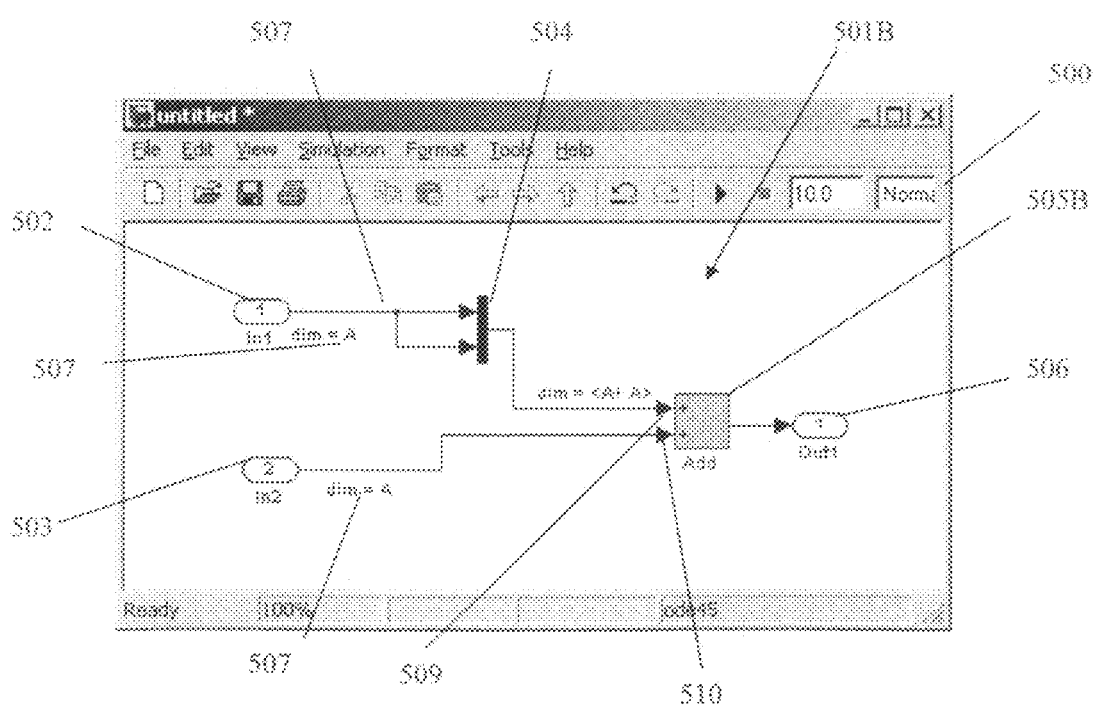

In decision block 240, the symbol propagation engine 140 may check for over-specified constraints amongst the symbolic expressions, which were received in block 220 and propagated in block 235. An over-specified constraint may exist when one or more symbolic expressions conflict with, or are inconsistent with, each other and/or the graphical model. This check may be performed by comparing, for example, each symbolic expression, entered in block 220, against the behavioral constraints, behavioral descriptions, properties, and/or sub-entities of each entity and/or the connectivity information present in the graphical model 130. If an over-specified constraint is identified the symbol propagation engine 140 may error out and issue an error alert to the user in block 245. If an error is detected, the user may then need to resolve the erroneous specification and re-start the process. Alternatively, the symbol propagation engine 140 may be able to reconcile the conflict or inconsistency instead of returning an error to the user. As an example, FIGS. 5A and 5B illustrate an over-specified relationship and is discussed further below. In FIG. 3A, there are no conflicts or inconsistencies, and the flow continues to block 250.

In block 250, the symbolic propagation engine 140 may check for under-specified constraints amongst symbolic expressions. An under-specified constraint may exist when, for example, one or more symbolic expressions and/or the graphical model do not inherently conflict, but the symbolic propagation engine 140 lacks sufficient information on the constraint to proceed. This check may be performed by comparing, for example, each symbolic expression, entered in block 220, against the behavioral constraints, behavioral descriptions, properties, and/or sub-entities of each entity and/or the connectivity information present in the graphical model 130. If an under-specified constraint between symbolic expressions is identified the process moves to block 255. FIGS. 6A, 6B, 7A, and 7B each illustrate an under-specified constraint and are discussed further below. If an under-specified constraint between symbolic expressions is not found, the process skips to block 260. In FIG. 3A, there are no under-specified constraints, and the flow continues to block 260.

Figure 6A:
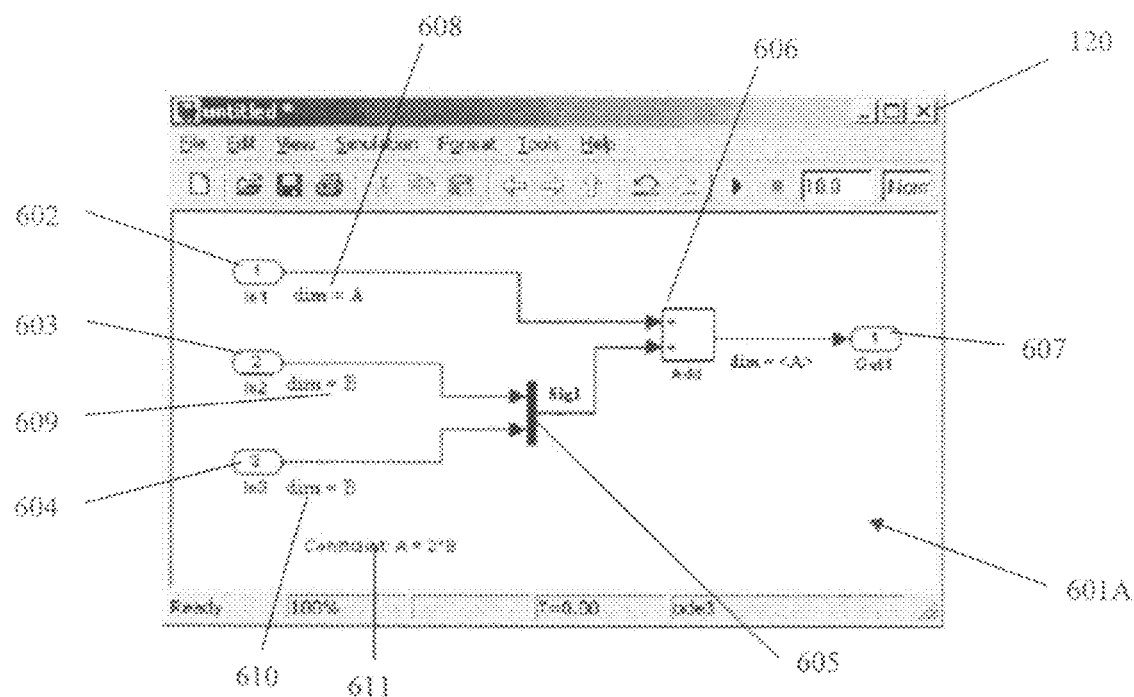
FIGS. 6A-6D depict an exemplary user-specified constraint operation.
Figure 6B:
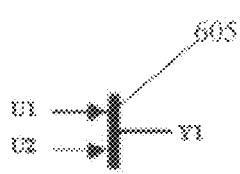
Figure 7A:
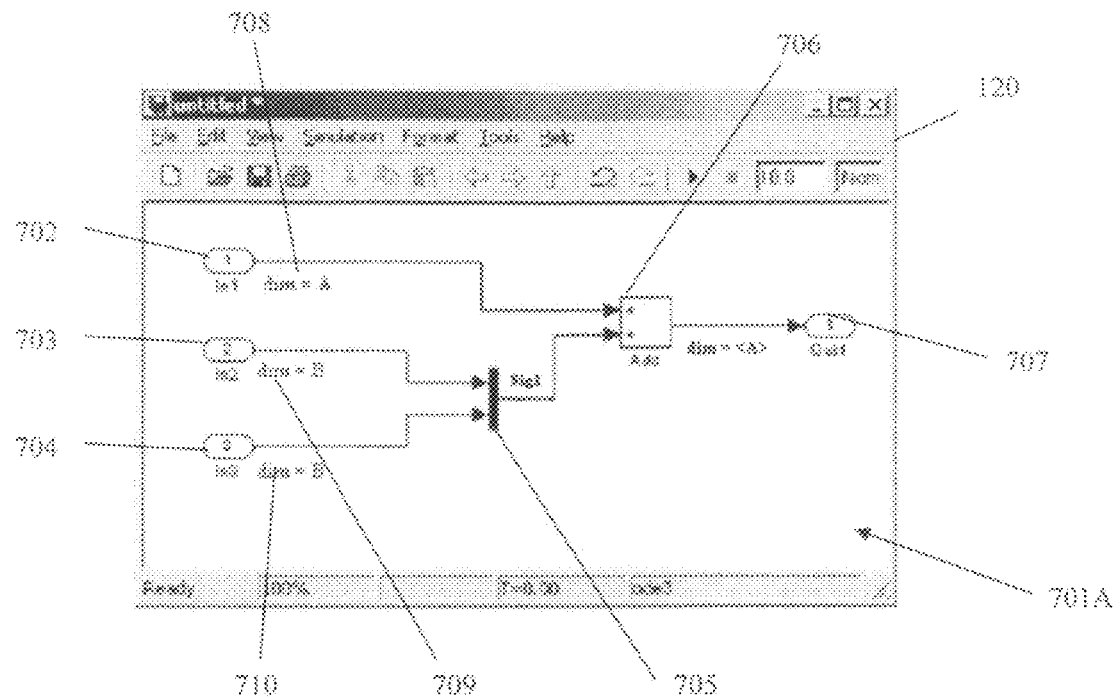
FIGS. 7A and 7B depict an exemplary automatically specified constraint operation.
Figure 7B:
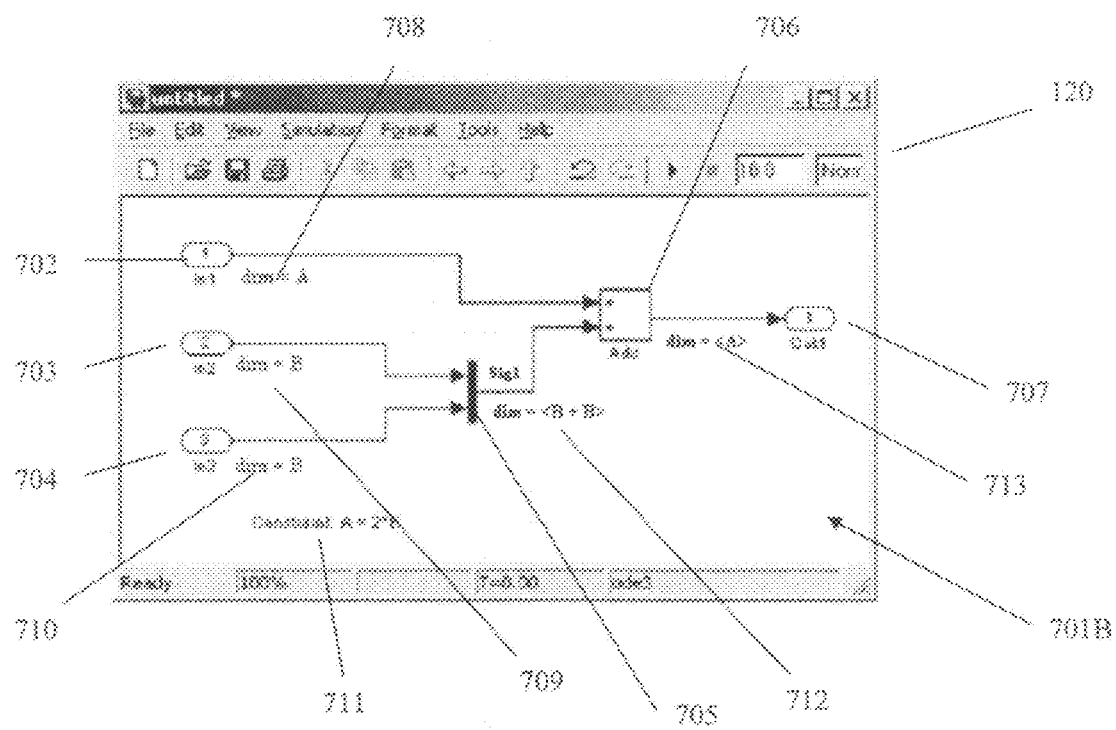

In block 255, if an under-specified constraint is identified in block 250, the symbol propagation engine 140 may impose additional constraints between the symbolic expressions. Based on the symbolic expressions received in block 220, the behavioral constraints of each entity, and the connectivity information present in the graphical model 130, the symbol propagation engine 140 may impose additional constraints consistent with the graphical model 130, any symbolic expressions received in block 220 and any constraints received in block 225. FIGS. 7A and 7B illustrate an automatic imposition of additional constraints, which is discussed further below. Alternatively, the user may prevent the symbol propagation engine 140 from automatically imposing additional constraints. In this case, if an under-specified constraint is detected, the symbol propagation engine 140 may stop, issue an error to the user, and ask the user to specify additional constraints or constraints. FIGS. 6A and 6B illustrate a user-specified constraint, which is discussed further below.

In block 260, the symbolic propagation engine 140 may express the property of the entities identified by block 230 and propagated by block 235 in the graphical modeling environment 130 in terms of the symbolic expressions received in block 220 and generate an updated model accordingly. The symbol propagation engine 140 may also incorporate constraints between symbolic expressions, received in blocks 225 and 255, when expressing properties. For example, each propagated symbolic expression may be depicted along with the property the symbolic expression represents. In FIG. 3B, the property of the additional entity identified by block 230 and propagated by 235, namely gain block 303, may be expressed in terms of the symbolic expression 'dim=A' 305 in the depicted graphical model 301B by the symbol propagation engine 140, of FIG. 1. The propagated symbolic expression, along with the corresponding property, may be depicted with '<' and '>' in the depicted graphical model. In FIG. 3B, the dimension property of the gain block 303 is depicted as 'dim=<A>' 306. Although '<A>' is used to depict the propagated symbolic expression in this example, propagated symbolic expressions may be indicated in a variety of alternative ways.

In block 265, code may be generated by the code generator 150 based on the graphical model 130 and each symbolic expression used in the model. The code generator 150 may be, for example, in the form of a code generation tool. The code generator 150 may, for example, transfer a graphical model 130 into a standard textual language that supports re-configuration, such as, for example, macros in the C language or in a templetized operation in C++. The generated code may contain the symbolic expressions received in block 220 and propagated in block 235 such that any relationship among the symbolic expressions is preserved in the code. The symbolic expressions and any relationships among symbolic expressions may be, for example, input to a preprocessor. The preprocessor may be a part of the program language itself. Examples of programming languages which contain a preprocessor may include C, C++, and Perl. The generated code may also include safeguards which prevent misuse of the generated code, such as, for example, operation of the code outside of the intended function of the code. These safeguards may include, for example, static compile-time checks or dynamic run time checks. FIG. 8 illustrates exemplary code generated by the code generator 150 and is discussed further below.

In block 270, the value for each symbolic expression used in the graphical model 130 may be received by the code preprocessor or code compiler 160. The value may be, for example, received from a user, a default setting, and/or dynamically specified by the computing environment 120. The value may, for example, be numeric, a Boolean value, or a set. The set may, for example, be in the form of a matrix. The set may include, for example, different values for each symbolic expression.

In block 275, the value, received by block 270, may be substituted for each symbolic expression by the code preprocessor or code compiler 160. By replacing the symbolic expressions with numerical values, or other program constructs, the code may be reconfigured. As an example, the preprocessor, which may be part of the program itself, may substitute the values for the symbolic expression.

In block 280, executable code may be compiled, by the code compiler 160, using the values substituted for each symbolic expression in block 275. The code compiler 160 may, for example, transform the standard textual language version of the graphical model obtained by the code generator 150 into a binary executable code. The executable code may then be executed by the computing environment 120 or another environment or application, or may be stored, for example, in the computer 110, another computer, or a computer-readable medium or may be sent via a network connected to the computer 110.

In block 285, the code compiler 160 may check for additional values. If additional values are provided the process the model may be re-targeted for the additional values by compiling a version of code, which incorporates the additional values, by repeating blocks 270, 275, and 280, discussed above. If additional values are not provided, the process moves to block 290 and ends. The additional values may be the next ones in the set of values received in block 270, or may be provided via a user prompt. By providing a set of values in block 270, executable code can be compiled in block 280 for a variety of values, which may be beneficial in designing or testing the code FIGS. 4A-9D illustrate several exemplary embodiments.

FIGS. 4A and 4B depict an exemplary propagation operation and are discussed in relation to the flowchart of FIGS. 2A and 2B. In FIG. 4A, the depicted graphical model 401A may include a first input block 402, a second input block 403, a Mux block 404, a gain block 405, and an output block 406.

In block 220, a symbolic expression 'A' may be received to represent the dimension property of a first entity, the first input block 402, and may be depicted as 'dim=A' 407. A symbolic expression 'B' may also be received to represent the dimension property of a second entity, the second input block 403, and may be depicted as 'dim=B' 408.

In block 230, other entities which share the dimension property, represented by symbolic expression 'A', of the first input block 402, and symbolic expression 'B', of the second input block 403, may be identified. In FIG. 4A, the Mux block 404 and the gain block 405 are identified as sharing the dimension property of the first input block 402, symbolic expression 'A'. The Mux block 404 and the gain block 405 are also identified as sharing the dimension property of the second input block 403, symbolic expression 'B'

In block 235, the symbolic expression 'A' and the symbolic expression 'B' may be propagated to the Mux block 404. The behavioral description 134 of the Mux block 404 dictates that the size of the output signal is equal to the sum of the input signals, represented by the symbolic expressions 'A' and 'B'. Therefore, a behavioral constraint 135 of the Mux block 404 may be the combined symbolic expression '<A+B>', which represents the output signal of the Mux block 404. The combined symbolic expression '<A+B>' may then be propagated in the same manner as any individual symbolic expression through to gain block 405. During propagation, the relationship among the combined, individual symbolic expressions may be preserved in the combined symbolic expressions.

In block 260, an expression of the property 133 of the Mux block 404 and the gain block 405 in terms of the symbolic expression 'A' and the symbolic expression 'B' may be depicted as 'dim=<A+B>' 409 and 'dim=<A+B>' 410, respectively.

FIGS. 5A and 5B depict an exemplary error detection operation. In FIG. 5A, the depicted graphical model may include an input block 502, an input block 503, a tool 504, a sum block 505A, and an output block 506. For blocks 502 and 503, the symbolic expression 'A' may be received for the dimension property of each block, which may be depicted as 'dim=A' 507. During propagation by the symbolic expression propagation engine 140, the dimension properties 507 may be propagated through the tool 504 resulting in the dimension property 'A+A', which may be depicted in FIG. 5B as 'dim=<A+A>'.

After the symbolic expression 'A' has been propagated, the symbol propagation engine 140 may also check for over-specified or under=specified constraints among symbolic expressions within the depicted graphical model 501B. In block 240 of FIG. 2A, this verification may be performed by comparing each symbolic expression entered with the behavioral constraints of each entity and the connectivity information present in the depicted graphical model 501B.

In FIG. 5B, the symbol propagation engine 140 may detect an error in the depicted graphical model 501B. In FIG. 5B, an over-specified constraint may exist between the connectivity information of the depicted graphical model and the behavioral constraints of each entity. Based on the connectivity information of FIG. 5B, tool 504 receives an input from the output of input block 502, sum block 505B receives an input from the output of tool 504 and input block 503, and output block 506 receives an input from the output of sum block 505B. Based on the behavioral constraints of each entity in FIG. 5B, input blocks 502 and 503 receive a value and output the value, tool 504 receives to dimensional values, adds them together, and outputs the resulting value, sum block 505B receives two values, adds them together, and outputs the resulting value. In FIG. 5B, the dimension of the first input 509, of the sum block 505B, equals <A+A>, while the dimension of the second input 510 equals <A>. Because the sum block 505B can only sum together inputted values having the same dimensional property, which is a behavioral constraint, the symbol propagation engine 140 may recognize that an error may be present. This is an example of a conflict due to over-specification. In block 245 of FIG. 2A, once an error is detected, the system may issue an error alert. In FIG. 5B, an error alert may be conveyed by darkening (or changing the color, or some other visual cue) the sum block 505B to indicate that an error was detected among the propagated symbolic expressions. If the user clicks on the darkened sum block 505B or hovers the mouse over the darkened block 505B, a pop-up help window may explain that the error that was detected and allow the user to correct the problem.

Figure 6C:
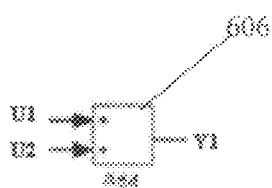

FIGS. 6A-6D depict an exemplary user-specified constraint operation of the symbol propagation engine 140 between multiple symbolic expressions. Constraint operations are discussed above with respect to block 255 of FIG. 1. In FIG. 6A, the depicted graphical model 601A may include an input block 602, an input block 603, an input block 604, a Mux block 605, a sum block 606, and an output block 607. For input blocks 602, 603, and 604, the symbolic expressions 'A', 'B', and 'B', respectively, may be received and may be depicted as 'dim=A' 608, 'dim=B' 609, and 'dim=B' 610, respectively. FIG. 6B depicts the Mux Block 605. Dimensional values may be propagated through Mux block 605, for example, according to the rule: dim(Y1)="dim(U1)+dim(U2)" (hereinafter rule 3). FIG. 6C depicts the sum block 606. Dimensional values may be propagated through Sum block 606, for example, according to the rule: dim(Y1)="dim(U1)" and dim(Y1)="dim(U2)" (hereinafter rule 4). The use of the quotation marks " " may help emphasize the preservation of the symbolic relationship. A constraint may also be specified by the user, see block 225 of FIG. 2A, which may be depicted in FIG. 6A as 'Constraint A=2*B' 611.

During propagation by the symbol propagation engine 140, the dimension properties 608, 609, and 610 may be propagated through model 601A in accordance with rules 3 and 4. Specifically, dim(In)1="A", dim(In2)="B", and dim(In3)="B". With respect to the Mux Block 605, according to rule 3, dim(Sig1)="dim(In2)+dim(In3)"="B+B". With respect to the sum block 606, according to rule 4, dim(Out1)="dim(Sig1)"="B+B"; and dim(Out1)="dim(In1)"="A".

Figure 6D:
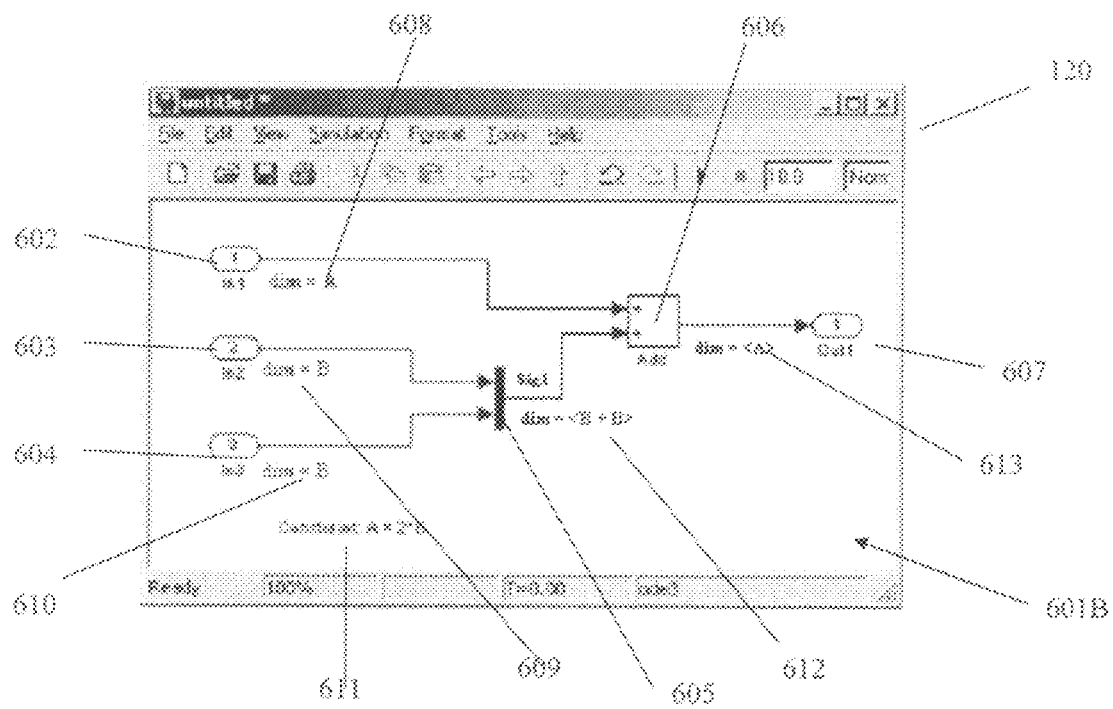

In FIG. 6D, once the symbolic expressions have been propagated, the symbol propagation engine 140 may check for under-specified constraints among the symbolic expressions in the depicted graphical model 601B, see block 250 in FIG. 2A. If an under-specified constraint is found, additional symbolic constraints may be automatically created or specified by a user, see block 255 in FIG. 2A. In FIG. 6D, because the user has specified a constraint 611 between the symbolic expressions 'A' and 'B', in block 225 in FIG. 2A, the propagation engine 140 may not recognize an under-specified constraint between the symbolic expressions and the process will continue.

Referring to FIG. 2B, in block 260, the dimension property of the Mux block 605 and the sum block 606 may be expressed in terms of the symbolic expressions 608, 609, and 610. Block 260 may also incorporate the user-specified constraint between the symbol expressions 'A' and 'B'. Accordingly, the dimension property of the Mux block 605 is 'B+B', which may be depicted in FIG. 6D as 'dim=<B+B>' 612. The dimension property of the sum block 606, in consideration of the constraint 607, is 'A', which may be depicted in FIG. 6D as 'dim=<A>' 613.

Referring to FIG. 2B, in block 265, once constraints between symbolic expressions have been specified, a code may be generated based on the depicted graphical model, each symbolic expression, and any constraints between each symbolic expression. In contrast to the prior art examples discussed with respect to FIGS. 12A-12D, symbolic expressions may be provided, combined with other symbolic expressions, and propagated through the system. During propagation, the relationship among symbolic expressions and/or combined symbolic expressions may be preserved. These relationships may also be preserved in the generated code. Referring to FIG. 2B, blocks 270-280 are discussed in connection with FIG. 8 below.

FIGS. 7A and 7B depict an exemplary automatically specified constraint operation of the symbol propagation engine 140 between multiple symbolic expressions, as opposed to the user-specified constraint operation discussed in connection with FIGS. 6A and 6B above. In FIG. 7A, the depicted graphical model 701A may include an input block 702, an input block 703, an input block 704, a Mux block 705, a sum block 706, and an output block 707. For input blocks 702, 703, and 704, the symbolic expressions 'A', 'B', and 'B', respectively, may be received and are depicted as 'dim=A' 708, 'dim=B' 709, and 'dim=B' 710, respectively. Dimensional values may be propagated through Mux block 705 and sum block 706, for example, according to rules 3 and 4, respectively. During propagation by the symbol propagation engine 140, the dimension properties 708, 709 and 710 may be propagated through model 701A, in accordance with rules 3 and 4, in a manner similar to that discussed above in connection with FIG. 6A.

In FIG. 7B, once the symbolic expressions have been propagated, the symbol propagation engine 140 may check for under-specified constraints among the symbolic expressions in the depicted graphical model 701B, see block 250 in FIG. 2A. If an under-specified constraint is found, additional symbolic constraints may be automatically created or specified by a user, see block 255 in FIG. 2A. In FIG. 7B, because the user has not earlier specified a constraint between the symbolic expressions 'A' and 'B'; the symbol propagation engine 140 may recognize that an under-specified constraint exists between the symbolic expressions 'A' and 'B' and automatically establish a constraint, 'A=2*B', that is consistent with the graphical model 701B, see block 255 in FIG. 2A, which may be depicted in FIG. 7B as 'Constraint A=2*B' 711, see block 260 in FIG. 2B. The symbol propagation engine may select the constraint 707 based the behavioral constraints of each entity within the depicted graphical model 701B, the connectivity information present in the graphical model 701B, and the symbolic expressions received from the user, 'A', 'B' and 'B'. Alternatively, the user may disable the symbol propagation engine's 140 ability to automatically establish constraints. Instead the propagation engine may issue an error alert to the user which prompts the user to enter a constraint.

Referring to FIG. 2B, in block 260, the dimension property of the Mux block 705 and the sum block 706 may be expressed in terms of the symbolic expressions 711, 712, and 713. Block 260 may also incorporate the user-specified constraint between the symbol expressions 'A' and 'B'. Accordingly, the dimension property of the Mux 705 is 'B+B', which may be depicted in FIG. 7B as 'dim=<B+B>' 713. The dimension property of the sum block 706, taking the constraint 707 into account, is 'A', may be depicted in FIG. 7B as 'dim=<A>' 714.

Referring to FIG. 2B, in block 265, once constraints between symbolic expressions have been specified, a code may be generated based on the depicted graphical model, each symbolic expression, and any constraints between each symbolic expression. In contrast to the prior art examples discussed with respect to FIGS. 12A-12D, symbolic expressions may be provided, combined with other symbolic expressions, and propagated through the system. During propagation, the relationship among symbolic expressions and/or combined symbolic expressions may be preserved. These relationships may also be preserved in the generated code. Referring to FIG. 2B, blocks 270-280 are discussed in connection with FIG. 8 below.

In FIG. 8, an exemplary generated code is depicted. Generating code is discussed above with respect to block 265 in FIG. 2B. The exemplary generated code is based on the depicted graphical model 601B, of FIG. 6B, which is identical to the depicted graphical model 701B, of FIG. 7B. The symbolic propagation for FIGS. 6B and 7B are discussed above. In FIG. 8, the code may be comprised of two files, the model.h file and the model.c file. The model.h file begins by defining the constraint between symbolic expression 'A' and symbolic expression 'B,' thus preserving the relationship between 'A' and 'B.' Lines 34-38 define the dimensional properties of signals 'In1,' 'In2,' and 'In3' as 'A,' 'B,' and 'B,' respectively, which are then used in lines 40-43 to define the output value. Lines 38-40 of the model.c file describe the operation of the Mux block 705 and lines 42-44 describe the operation of the sum block 706.

In contrast to the prior art examples of code depicted in FIGS. 13A and 13B, the need to retain the symbolic relationship between the symbolic expressions in the code may constrain the code generation engine 150. For example, in order to generate re-configurable code, it may not be possible to perform an inlining operation, i.e. loop unrolling, on each element in an array. For example, the code of FIG. 8 contains an upper-bound of a for loop.

Continuing with FIG. 8, in block 270 of FIG. 2B, the value for each symbolic expression used in the graphical model 601B and 701B may be received. In block 275 of FIG. 2B, once code has been generated in block 265, the code can be configured to support various dimension sizes using a define command to define 'A' or 'B'. The define command may, for example, define B=2 where B has 2 dimensions. The define command may be, for example, received from a user, a default setting, and/or dynamically specified by the computing environment 120. In block 280 of FIG. 2B, executable code may be generated.

Figure 9A:
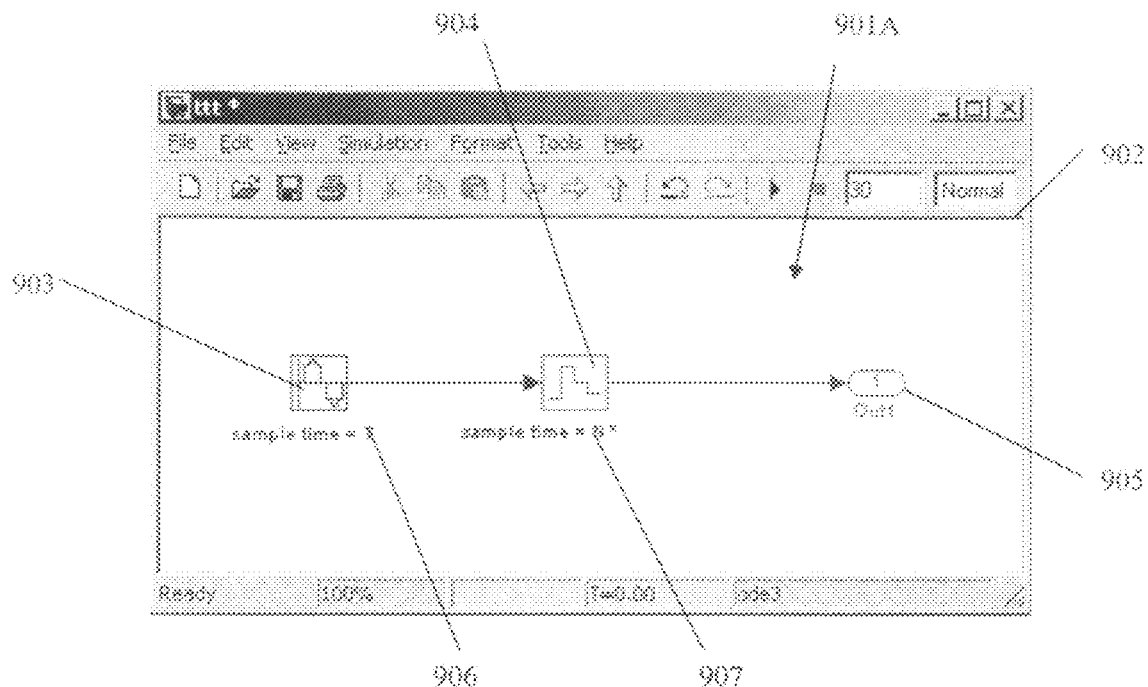
Figure 9B:
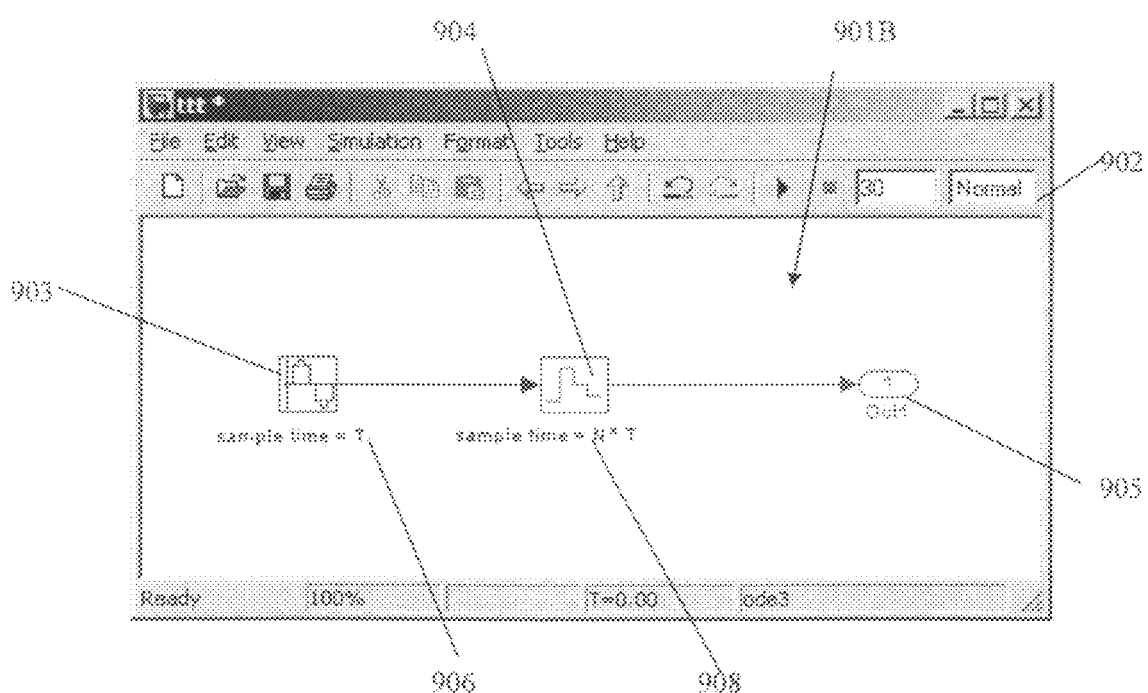

FIGS. 9A-9D depict an exemplary embodiment used to propagate a sample rate. Similar to the property propagation of dimensional information in FIGS. 3A-8, this embodiment of the invention may be used to propagate the sample rate of an input signal. In FIG. 9A, the depicted graphical model may include a sample block 903, a SinWave block 904, and an output block 905. For the sample block 903 and the SinWave block 904, the symbolic expressions 'T' and 'N', respectively, may be received. Symbolic expression 'T' represents a sample time and symbolic expression 'N' represents the number of sample periods that are held. The symbolic expressions 'T' and 'N' may be depicted as 'sample time=T' 906 and 'sample time=N*' 907, respectively.

During propagation by the symbol propagation engine 140, the symbolic expression 'T' may be propagated through the SinWave block 904. The behavioral description 134 of the SinWave block 904 dictates that the sample rate of the output signal is the product of the number of sample periods of SinWave block 904, 'N', and the sample time of an input signal, 'T'. Therefore, a behavioral constraint 135 of the SinWave block 904 may be 'N*T', which represents the output signal of the SinWave block 904 and may be depicted in FIG. 9B as 'sample time=N*T' 908.

In FIG. 9C, an exemplary code based on block 265, of FIG. 2B, is depicted. The exemplary code may be generated based on the depicted graphical model 901B, 'sample time=T' 906, and 'sample time=N*T' 908. When using symbolic timing information, 'N,' 'T,' and the relationship between 'N' and "T" may be preserved in the generated code. A user may then re-define the numerical value of 'N' and 'T' to achieve different instantiation of the code.

For comparison purposes, an exemplary code based on the prior art is depicted in FIG. 9D. Without symbolic representation, the timing information translates into numerical values in the generated code directly. In line 6, schedule code is fixed to invoke second execution tasks every other time the base execution task is invoked. In lines 20-40, code generation for SinWave block is restricted to output every 0.3 time units. Referring to the code depicted in FIG. 9C, when a user chooses N=2 and T=0.3, the result is identical to the code depicted in FIG. 9D.

Figure 10:
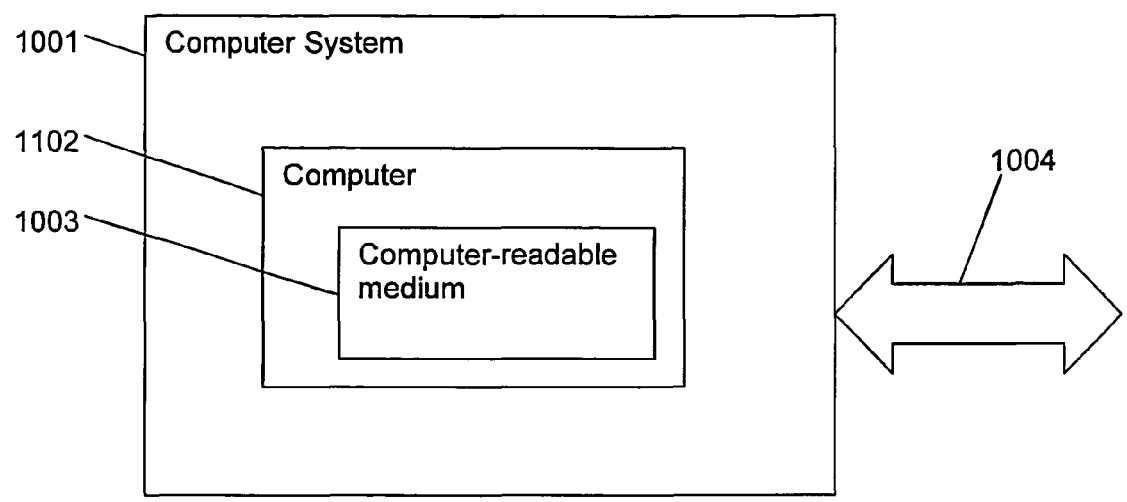
FIG. 10 depicts a computer system for use with exemplary embodiments.

FIG. 10 depicts a computer system for use with embodiments. The computer system 1001 includes a computer 1102 for implementing. The computer 1102 includes a computer-readable medium 1003 embodying software for implementing one or more embodiments and/or software to operate the computer 1102. As an option, the computer system 1001 includes a connection to a network 1004. With this option, the computer 1102 may be able to send and receive information (e.g., software, data, documents) from other computer systems via the network 1004. As discussed above, the computer 1102 may implement both the computing environment 120.

Exemplary embodiments may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Figure 11:
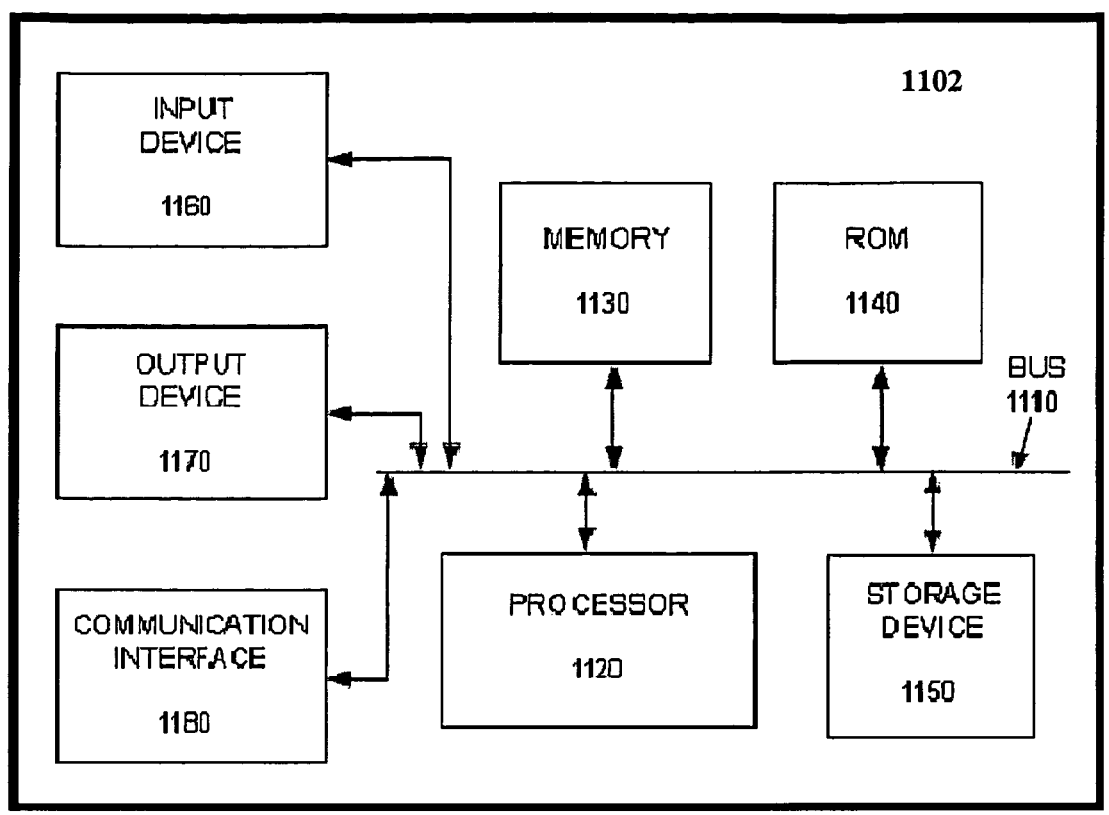
FIG. 11 depicts an exemplary computer architecture for use with exemplary embodiments.

FIG. 11 illustrates an exemplary architecture for implementing computer 1102 of FIG. 10. It will be appreciated that other devices that can be used with the computer system 1001 may be similarly configured. As illustrated in FIG. 11, computer 1102 may include a bus 1110, a processor 1120, a memory 1130, a read only memory (ROM) 1140, a storage device 1150, an input device 1160, an output device 1133, and a communication interface 1180.

Bus 210 may include one or more interconnects that permit communication among the components of computer 1102. Processor 1120 may include any type of processor, microprocessor, or processing logic that may interpret and execute instructions (e.g., a field programmable gate array (FPGA)). Processor 1120 may include a single device (e.g., a single core) and/or a group of devices (e.g., multi-core). Memory 1130 may include a random access memory (RAM) or another type of dynamic storage device that may store information and instructions for execution by processor 1120. Memory 1130 may also be used to store temporary variables or other intermediate information during execution of instructions by processor 1120.

ROM 1140 may include a ROM device and/or another type of static storage device that may store static information and instructions for processor 1120. Storage device 1150 may include a magnetic disk and/or optical disk and its corresponding drive for storing information and/or instructions. Storage device 1150 may include a single storage device or multiple storage devices, such as multiple storage devices operating in parallel. Moreover, storage device 1150 may reside locally on computer 1102 and/or may be remote with respect to computer 1102 and connected thereto via network 120 and/or another type of connection, such as a dedicated link or channel.

Input device 1160 may include any mechanism or combination of mechanisms that permit an operator to input information to computer 1102, such as a keyboard, a mouse, a touch sensitive display device, a microphone, a pen-based pointing device, and/or a biometric input device, such as a voice recognition device and/or a finger print scanning device. Output device 1133 may include any mechanism or combination of mechanisms that outputs information to the operator, including a display, a printer, a speaker, etc.

Communication interface 1180 may include any transceiver-like mechanism that enables computer 1102 to communicate with other devices and/or systems, such as a client, a license manager, a vendor, etc. For example, communication interface 1180 may include one or more interfaces, such as a first interface coupled to network 1004 and/or a second interface coupled to the license manager. Alternatively, communication interface 1180 may include other mechanisms (e.g., a wireless interface) for communicating via a network, such as a wireless network. In one implementation, communication interface 1180 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 1102 may perform certain functions in response to processor 1120 executing software instructions contained in a computer-readable medium, such as memory 1130. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments of the invention may be embodied in many different ways as a software component. For example, it may be a stand-alone software package, or it may be a software package incorporated as a tool in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Each of the blocks in the flowchart of FIGS. 2A and 2B may be implemented with one or more computer-executable instructions. The one or more computer-executable instructions may be stored on one or more computer-readable mediums.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 2A and 2B, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 10, and 11 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or any combination of hardware, software, and wetware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The examples and embodiments described herein are non-limiting examples.

The scope of the invention is defined by the claims and their equivalents.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A non-transitory computer-readable medium storing computer-executable instructions, the medium holding:
    one or more instructions for receiving a graphical model, wherein the graphical model comprises a plurality of entities and connectivity information between the entities, wherein the entities comprise properties, behavioral descriptions, and optionally behavioral constraints;
    one or more instructions for receiving a symbolic expression for the graphical model, wherein the symbolic expression represents a property of a first entity in the graphical model;
    one or more instructions for identifying a second entity comprising the property represented by the symbolic expression, wherein identifying is based on at least one of the connectivity information, a behavioral description, or a behavioral constraint;
    one or more instructions for propagating the symbolic expression to the second entity;
    one or more instructions for expressing the second entity in terms of the propagated symbolic expression;
    one or more instructions for identifying an under-specified constraint between the symbolic expression and a second symbolic expression, when the symbolic expression and the second symbolic expression do not inherently conflict but the second entity of the graphical model is unable to be expressed in terms of the symbolic expression or the second symbolic expression; and
    one or more instructions for generating a constraint between the symbolic expression and the second symbolic expression when the under-specified constraint exists, wherein the generated constraint is consistent with the graphical model.

2. The non-transitory computer-readable medium of claim 1, further comprising:
    one or more instructions for identifying an over-specified constraint between the symbolic expression and the second symbolic expression or the graphical model, wherein the over-specified constraint exists when the symbolic expression conflicts with or is inconsistent with the second symbolic expression.

3. The non-transitory computer-readable medium of claim 2, further comprising:
one or more instructions for generating an error alert when the under-specified constraint or over-specified constraint exists.

4. The non-transitory computer-readable medium of claim 1, further comprising:
one or more instructions for generating code based on the graphical model and the symbolic expression in the graphical model, the generated code preserving the symbolic expression and the propagated symbolic expression.

5. The non-transitory computer-readable medium of claim 4, further comprising:
one or more instructions for receiving a value for the symbolic expression in the graphical model,
one or more instructions for substituting the received value for the symbolic expression in the generated code, and
one or more instructions for compiling an executable code using the received values.

6. The non-transitory computer-readable medium of claim 4, further comprising:
one or more instructions for receiving a set of values for the symbolic expression in the graphical model, the set of values comprising a first subset and a second subset;
one or more instructions for substituting the first subset of the set of values for the symbolic expression in the generated code;
one or more instructions for compiling a first executable code using the first subset of the set of values;
one or more instructions for substituting the second subset of the set of values for the symbolic expression in the generated code; and
one or more instructions for compiling a second executable code using the second subset of the set of values.

7. The non-transitory computer-readable medium of claim 1, wherein identifying is based on at least one of the connectivity information or a behavioral description.

8. The non-transitory computer-readable medium of claim 1, wherein at least one entity comprises at least one sub-entity.

9. A computer-implemented method for propagating symbolic expressions, the method comprising:
identifying a graphical model by a computer, wherein the graphical model comprises a first entity coupled to a second entity and connectivity information, wherein the first entity comprises a first property, a first behavioral constraint, and optionally a first behavioral description, wherein the second entity comprises the first property, a second behavioral constraint, and optionally a second behavioral description, wherein the first behavioral constraint and the second behavioral constraint are identical or different, wherein the first behavioral description and the second behavioral description are identical or different;
receiving by the computer a first symbolic expression to represent the first property of the first entity in the graphical model;
identifying by the computer the first property in the first entity and the first property in the second entity based on at least one of the connectivity information, a behavioral constraint of the first entity or the second entity, or a behavioral description of the first entity or the second entity;
propagating by the computer the first symbolic expression to the second entity to represent the first property of the second entity with the first symbolic expression;
expressing by the computer the first and the second entities in terms of the first symbolic expression to obtain an updated graphical model;
identifying an under-specified constraint between the first symbolic expression and a second symbolic expression, when the first symbolic expression and the second symbolic expression do not inherently conflict but at least one entity of the graphical model is unable to be expressed in terms of the first symbolic expression or the second symbolic expression;
generating a constraint between the first symbolic expression and the second symbolic expression when an under-specified constraint exists, wherein the generated constraint is consistent with the graphical model; and
displaying by the computer the updated graphical model.

10. The method of claim 9, further comprising:
generating a reconfigurable code based on the graphical model and the first symbolic expression.

11. The method of claim 10, further comprising:
substituting a first value for the first symbolic expression in the reconfigurable code; and
compiling an executable code based on the first value substituted for the first symbolic expression and the reconfigurable code.

12. The method of claim 11, further comprising:
substituting a second value for the first symbolic expression in the reconfigurable code; and
compiling an executable code based on the second value substituted for the first symbolic expression and the reconfigurable code.

13. The method of claim 9, wherein the graphical model includes a third entity coupled to the second entity, wherein the second entity further comprises a second property, wherein the third entity comprises the second property, a third behavioral constraint, and optionally a third behavioral description, wherein the second behavioral constraint and the third behavioral constraint are identical or different, wherein the second behavioral description and the third behavioral description are identical or different, wherein the second symbolic expression represents the second property of the third entity in the graphical model, the method further comprising:
identifying the first property in the first and the second entities and the second property in the second and the third entities based on at least one of the connectivity information, a behavioral constraint of the first, the second, or the third entities, or a behavioral description of the first, the second, or the third entities;
propagating the second symbolic expression to the second entity to represent the second property of the second entity with the second symbolic expression; and
expressing the second and third entities in terms of the second symbolic expression.

14. The method of claim 13, wherein the graphical model includes a fourth entity coupled to the third entity, wherein the fourth entity comprises the second property, a fourth behavioral constraint, and optionally a fourth behavioral description, wherein the third behavioral constraint and the fourth behavioral constraint are identical or different, wherein the third behavioral description and the fourth behavioral description are identical or different, the method further comprising:

propagating the second symbolic expression to the fourth entity to represent the second property of the fourth entity with the second symbolic expression; and expressing the third and fourth entities in terms of the second symbolic expression.

15. The method of claim 13, wherein prior to propagating, further comprising:

receiving a constraint between the first symbolic expression and the second symbolic expression.

16. The method of claim 13, wherein propagating further comprises:

identifying an over-specified constraint between at least one of the first symbolic expression and the second symbolic expression or the graphical model, wherein the over-specified constraint exists when the first symbolic expression conflicts with or is inconsistent with the second symbolic expression or the graphical model; and generating an error alert when the over-specified constraint is detected.

17. The method of claim 13, wherein propagating further comprises:

identifying an over-specified constraint between at least one of the first symbolic expression and the second symbolic expression or the graphical model, wherein the over-specified constraint exists when the first symbolic expression conflicts with or is inconsistent with the second symbolic expression or the graphical model; and reconciling the over-specified constraint when the over-specified constraint is detected.

18. The method of claim 13, the operations further comprising:

generating a reconfigurable code based on the graphical model, the first symbolic expression, and the second symbolic expression, wherein the relationship between the first symbolic expression and the second symbolic expression is preserved.

19. The method of claim 18, the operations further comprising:

assigning a first set of values to the first and the second symbolic expressions; and compiling an executable code based on the first set of values.

20. The method of claim 19, the operations further comprising:

assigning a second set of values to the first and the second symbolic expressions; and compiling an executable code based on the second set of values.

21. A method for generating code in a graphical modeling environment comprising one of:

downloading software to a computer system, which when executed by the computer system causes the computer system to perform operations comprising the method of claim 9; or providing downloadable software to download to a computer system, which when executed by the computer system causes the computer system to perform operations comprising the method of claim 9.

22. A system for propagating symbolic expressions comprising:

a processor for:

identifying a graphical model, wherein the graphical model comprises a first entity coupled to a second entity and connectivity information, wherein the first entity comprises a first property, a first behavioral constraint, and optionally a first behavioral description, wherein the second entity comprises the first property, a second behavioral constraint, and optionally a second behavioral description, wherein the first behavioral constraint and the second behavioral constraint are identical or different, wherein the first behavioral description and the second behavioral description are identical or different;

receiving a first symbolic expression to represent the first property of the first entity in the graphical model;

identifying the first property in the first entity and the first property in the second entity based on at least one of the connectivity information, a behavioral constraint, or a behavioral description of the first entity and the second entity;

propagating the first symbolic expression to the second entity to represent the first property of the second entity with the first symbolic expression; and expressing the first and the second entities in terms of the first symbolic expression to obtain an updated graphical model;

identifying an under-specified constraint between the first symbolic expression and a second symbolic expression, when the first symbolic expression and the second symbolic expression do not inherently conflict but at least one entity of the graphical model is unable to be expressed in terms of the first symbolic expression or the second symbolic expression;

generating a constraint between the first symbolic expression and the second symbolic expression when an under-specified constraint exists, wherein the generated constraint is consistent with the graphical model; and a display device for:

displaying the updated graphical model.

23. The computer-readable medium of claim 1, further comprising:

one or more instructions for generating an updated graphical model based on the symbolic expression and any generated constraint.

* * * * *

UNITED STATES PATENT AND TRADEMARK OFFICE
CERTIFICATE OF CORRECTION

PATENT NO. : 8,700,378 B1  
APPLICATION NO. : 12/000436  
DATED : April 15, 2014  
INVENTOR(S) : Xiaocang Lin Page 1 of 1

It is certified that error appears in the above-identified patent and that said Letters Patent is hereby corrected as shown below:

On the Title page, item [54] and in the Specification, Col. 1, in the Title, "RECONFIGURATION" should read -- RECONFIGURABLE --.

Signed and Sealed this  
Ninth Day of September, 2014

Michelle K. Lee  
*Deputy Director of the United States Patent and Trademark Office*